(12) United States Patent
Donovan et al.

(10) Patent No.: US 10,836,674 B2
(45) Date of Patent: Nov. 17, 2020

(54) CARRIER APPARATUS AND METHODS OF PROCESSING A CARRIER APPARATUS

(71) Applicant: Corning Incorporated, Corning, NY (US)

(72) Inventors: Michael Patrick Donovan, Painted Post, NY (US); Jacob Immerman, Corning, NY (US); Jenny Kim, Horseheads, NY (US); Jae-Chang Lee, Seoul (KR)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 16/496,214

(22) PCT Filed: Mar. 21, 2018

(86) PCT No.: PCT/US2018/023504
§ 371 (c)(1),
(2) Date: Sep. 20, 2019

(87) PCT Pub. No.: WO2018/175541
PCT Pub. Date: Sep. 27, 2018

(65) Prior Publication Data
US 2020/0048142 A1    Feb. 13, 2020

Related U.S. Application Data

(60) Provisional application No. 62/474,365, filed on Mar. 21, 2017.

(51) Int. Cl.
*C03C 15/00* (2006.01)
*C03C 17/00* (2006.01)

(52) U.S. Cl.
CPC ............ *C03C 15/00* (2013.01); *C03C 17/002* (2013.01); *C03C 2218/33* (2013.01)

(58) Field of Classification Search
CPC .... C03C 15/00; C03C 17/002; C03C 2218/33
See application file for complete search history.

(56) References Cited

U.S. PATENT DOCUMENTS

| 5,902,704 A | 5/1999 | Schoenborn et al. |
| 8,017,459 B2 | 9/2011 | Yang et al. |
| (Continued) | | |

FOREIGN PATENT DOCUMENTS

| CN | 102145979 A | 8/2011 |
| CN | 104045240 A | 9/2014 |
| (Continued) | | |

OTHER PUBLICATIONS

International Search Report and Written Opinion of the International Searching Authority; PCT/US2018/023504; dated Jun. 21, 2018; 16 Pages; European Patent Office.

*Primary Examiner* — Anita K Alanko

(57) ABSTRACT

A carrier apparatus includes an article including a first major surface, a second major surface, a thickness between the first major surface and the second major surface, and an outer edge extending across the thickness between the first major surface and the second major surface. The carrier apparatus includes a coating including a central portion disposed on the first major surface of the article and an outer exposed portion disposed on the outer edge of the article, and a gasket including a first surface contacting the coating. An outer interface between the first surface of the gasket and the coating defines an outer boundary isolating the central portion of the coating from the outer exposed portion of the coating. Methods of processing a carrier apparatus to remove at least a portion of the coating from the article are also provided.

19 Claims, 8 Drawing Sheets

(56) References Cited

U.S. PATENT DOCUMENTS

| | | | |
|---|---|---|---|
| 10,296,436 B2 * | 5/2019 | Hildebrand | ......... G06F 11/3495 |
| 2015/0218045 A1 * | 8/2015 | Balcom | ................... C03B 25/02 |
| | | | 65/30.14 |
| 2016/0152517 A1 | 6/2016 | Chen et al. | |
| 2018/0016179 A1 | 1/2018 | Canfield et al. | |

FOREIGN PATENT DOCUMENTS

| | | | | |
|---|---|---|---|---|
| KR | 939865 B1 | 1/2010 | | |
| KR | 1513684 B1 | 4/2015 | | |
| WO | WO-2013137332 A1 * | 9/2013 | ............ | C03C 21/002 |

* cited by examiner

CARRIER APPARATUS AND METHODS OF PROCESSING A CARRIER APPARATUS

CROSS REFERENCE TO RELATED APPLICATIONS

This application claims the benefit of priority under 35 U.S.C. § 371 of International Application Serial No. PCT/US2018/023504, filed Mar. 21, 2018, which claims the benefit of priority under 35 U.S.C. § 119 of U.S. Provisional Application Ser. No. 62/474,365, filed Mar. 21, 2017, the contents of both of which are relied upon and incorporated herein by reference in their entirety.

FIELD

The present disclosure relates generally to a carrier apparatus and methods of processing a carrier apparatus and, more particularly, to a carrier apparatus including an article including a coating disposed on the article and methods of processing the carrier apparatus by exposing an exposed portion of the coating to an etchant.

BACKGROUND

Glass sheets are commonly used, for example, in display applications, for example liquid crystal displays (LCDs), electrophoretic displays (EPD), organic light emitting diode displays (OLEDs), plasma display panels (PDPs), or the like. Glass sheets are commonly fabricated by flowing molten glass to a forming body whereby a glass ribbon may be formed by a variety of ribbon forming processes, for example, slot draw, float, down-draw, fusion down-draw, rolling, or up-draw. The glass ribbon may then be subsequently divided to provide sheet glass suitable for further processing into a desired display application including, but not limited to, a screen or cover glass for mobile devices, televisions, computers, tablets, and other display monitors.

There is a demand for high quality glass sheets that include a material deposited on a major surface of the glass sheet to, for example, provide at least one of an abrasion and scratch resistant coating on the glass sheet and increase a strength of the glass sheet to prevent breakage of the glass sheet. The demand extends to glass sheets including planar (e.g., 2D) portions as well as to glass sheets including non-planar (e.g., 3D) portions. Some processes of depositing a material on the glass sheet include handling and transport of the glass sheet. For example, some glass coating deposition technologies include at least one of physical, plasma, and chemical vapor deposition that provides a coating on the glass sheet as the glass sheet is handled and transported during the coating deposition process. The coatings may be optically transparent so as to provide minimal to no interference with or distortion of images that may be displayed on or viewed through the glass sheet. Other techniques may provide a sapphire cover glass to protect the glass sheet from scratches; however, a surface coating provided by depositing a material on the glass sheet that prevents abrasions and scratches on the glass sheet and increases a strength of the glass sheet may provide a more efficient and less expensive glass sheet than, for example, a sapphire cover glass and may, therefore, be employed in a variety of display applications with significant cost savings.

Glass articles, for example cover glass, such as for example, cover glass for a mobile phone, may be manufactured with one or more surface treatments to enhance its functions and provide a positive experience for an end user. For example, cover glass may be coated with one or more coating layers to provide desired characteristics. Such coating layers may include anti-reflection coating layers, easy-to-clean coating layers, and scratch resistant coating layers. These coating layers may be applied on a surface of the cover glass using various vacuum deposition methods for example sputtering, plasma vapor deposition (PVD), chemical vapor deposition (CVD), and plasma-enhanced chemical vapor deposition (PECVD). These coating layers may be applied to an entire surface of the cover glass (e.g., an edge-to-edge coating of a cover glass surface). In some embodiments, a pressure sensitive adhesive (e.g., double-sided Kapton tape) may be used to hold the cover glass on a support plate during a coating process.

Moreover, during a coating process, it may be desirable that the material deposited on the glass sheet is deposited only on, for example, the major surface with which a user may interact. For example, a glass sheet may be provided in a touch-screen application where a user may physically contact the glass sheet to control features of a display device. Likewise, a glass sheet may be provided in an application where a major surface of the glass is provided for viewing by a user and is, therefore, exposed to the environment including dust, debris, and other objects that may scratch and abrade the surface of the glass. Thus, there is a desire for a carrier apparatus including a glass sheet and a method to process the carrier apparatus that at least one of prevents material and subsequently removes material from the glass sheet, such that material deposited on the glass sheet is deposited only on, for example, the major surface with which a user may interact.

SUMMARY

There are set forth exemplary embodiments of a carrier apparatus including an article including a first major surface, a second major surface, a thickness between the first major surface and the second major surface, and an outer edge extending across the thickness between the first major surface and the second major surface. Methods of processing the carrier apparatus are also provided.

Some exemplary embodiments of the disclosure are described below with the understanding that any of the embodiments may be used alone or in combination with one another.

Embodiment 1

A carrier apparatus includes an article including a first major surface, a second major surface, a thickness between the first major surface and the second major surface, and an outer edge extending across the thickness between the first major surface and the second major surface. The carrier apparatus includes a coating including a central portion disposed on the first major surface of the article and an outer exposed portion disposed on the outer edge of the article, and a gasket including a first surface contacting the coating. An outer interface between the first surface of the gasket and the coating defines an outer boundary isolating the central portion of the coating from the outer exposed portion of the coating.

Embodiment 2

A method of processing the carrier apparatus of embodiment 1 includes exposing the outer exposed portion of the coating to an etchant.

Embodiment 3

The method of embodiment 2, exposing the outer exposed portion of the coating to the etchant includes submerging the outer exposed portion of the coating into a bath including the etchant.

Embodiment 4

The method of embodiment 2 or embodiment 3, exposing the outer exposed portion of the coating to the etchant removes the outer exposed portion of the coating from the article.

Embodiment 5

The method of embodiment 4, after removing the outer exposed portion of the coating from the article, the coating is disposed entirely on the first major surface of the article.

Embodiment 6

The method of any one of embodiments 2-5, the carrier apparatus further includes a base including a support surface. A second surface of the gasket contacts the support surface of the base, and the method further includes applying a force to the article in a direction toward the support surface of the base, thereby pressing the gasket between the support surface of the base and the coating.

Embodiment 7

The method of embodiment 6, exposing the outer exposed portion of the coating to the etchant is performed while applying the force to the article.

Embodiment 8

The carrier apparatus of embodiment 1, the article further includes an aperture defined between a first opening in the first major surface of the article and a second opening in the second major surface of the article, an inner edge of the article extending across the thickness between the first opening and the second opening. The coating includes an inner exposed portion disposed on the inner edge of the article, and an inner interface between the first surface of the gasket and the coating defines an inner boundary isolating the central portion of the coating from the inner exposed portion of the coating.

Embodiment 9

A method of processing the carrier apparatus of embodiment 8 includes exposing the outer exposed portion of the coating and the inner exposed portion of the coating to an etchant.

Embodiment 10

The method of embodiment 9, exposing the outer exposed portion of the coating and the inner exposed portion of the coating to the etchant includes submerging the outer exposed portion of the coating and the inner exposed portion of the coating into a bath including the etchant.

Embodiment 11

The method of embodiment 9 or embodiment 10, exposing the outer exposed portion of the coating and the inner exposed portion of the coating to the etchant removes the outer exposed portion of the coating and the inner exposed portion of the coating from the article.

Embodiment 12

The method of embodiment 11, after removing the outer exposed portion of the coating and the inner exposed portion of the coating from the article, the coating is disposed entirely on the first major surface of the article.

Embodiment 13

The method of any one of embodiments 9-12, the carrier apparatus further includes a base including a support surface. A second surface of the gasket contacts the support surface of the base, and the method further includes applying a force to the article in a direction toward the support surface of the base, thereby pressing the gasket between the support surface of the base and the coating.

Embodiment 14

The method of embodiment 13, exposing the outer exposed portion of the coating and the inner exposed portion of the coating to the etchant is performed while applying the force to the article.

Embodiment 15

The method of any one of embodiments 2-7 and 9-14, the article includes a sheet including glass, glass-ceramic, ceramic, or combinations thereof.

Embodiment 16

A carrier apparatus includes an article including a first major surface, a second major surface, a thickness between the first major surface and the second major surface, and an aperture defined between a first opening in the first major surface of the article and a second opening in the second major surface of the article, an inner edge of the article extending across the thickness between the first opening and the second opening. The carrier apparatus includes a coating including a central portion disposed on the first major surface of the article and an inner exposed portion disposed on the inner edge of the article, and a gasket including a first surface contacting the coating. An inner interface between the first surface of the gasket and the coating defines an inner boundary isolating the central portion of the coating from the inner exposed portion of the coating.

Embodiment 17

A method of processing the carrier apparatus of embodiment 16 includes exposing the inner exposed portion of the coating to an etchant.

Embodiment 18

The method of embodiment 17, exposing the inner exposed portion of the coating to the etchant includes submerging the inner exposed portion of the coating into a bath including the etchant.

Embodiment 19

The method of embodiment 17 or embodiment 18, exposing the inner exposed portion of the coating to the etchant removes the inner exposed portion of the coating from the article.

Embodiment 20

The method of embodiment 19, after removing the inner exposed portion of the coating from the article, the coating is disposed entirely on the first major surface of the article.

Embodiment 21

The method of any one of embodiments 17-20, the carrier apparatus further includes a base including a support surface. A second surface of the gasket contacts the support surface of the base, and the method further includes applying a force to the article in a direction toward the support surface of the base, thereby pressing the gasket between the support surface of the base and the coating.

Embodiment 22

The method of embodiment 21, exposing the inner exposed portion of the coating to the etchant is performed while applying the force to the article.

Embodiment 23

The method of any one of embodiments 17-22, the article includes a sheet including glass, glass-ceramic, ceramic, or combinations thereof.

Embodiment 24

A carrier apparatus includes an article including a first major surface, a second major surface, a thickness between the first major surface and the second major surface, and an outer edge extending across the thickness between the first major surface and the second major surface. The carrier apparatus includes a coating including a central portion disposed on the first major surface of the article and an outer exposed portion disposed on the outer edge of the article, and a plurality of gaskets. A first gasket of the plurality of gaskets includes a first surface contacting the coating, and a first outer interface between the first surface of the first gasket and the coating defines a first outer boundary isolating the central portion of the coating from the outer exposed portion of the coating. A second gasket of the plurality of gaskets includes a second surface contacting the second major surface of the article, and a second outer interface between the second surface of the second gasket and the second major surface of the article defines a second outer boundary isolating a central portion of the second major surface of the article from an outer exposed portion of the second major surface of the article.

Embodiment 25

The carrier apparatus of embodiment 24, the first outer boundary laterally circumscribes the second outer boundary.

Embodiment 26

A method of processing the carrier apparatus of embodiment 24 or embodiment 25 includes exposing the outer exposed portion of the coating to an etchant.

Embodiment 27

The method of embodiment 26, exposing the outer exposed portion of the coating to the etchant includes submerging the outer exposed portion of the coating into a bath including the etchant.

Embodiment 28

The method of embodiment 26 or embodiment 27, exposing the outer exposed portion of the coating to the etchant removes the outer exposed portion of the coating from the article.

Embodiment 29

The method of embodiment 28, after removing the outer exposed portion of the coating from the article, the coating is disposed entirely on the first major surface of the article.

Embodiment 30

The method of any one of embodiments 26-29, the carrier apparatus further includes a first base including a support surface facing the first major surface of the article, and a second base including a support surface facing the second major surface of the article. The article, the coating, the first gasket, and the second gasket are positioned between the support surface of the first base and the support surface of the second base.

Embodiment 31

The method of embodiment 30 further includes applying at least one of a first force to the first base in a direction toward the support surface of the second base and a second force to the second base in a direction toward the support surface of the first base, thereby pressing the first surface of the first gasket against the coating and the second surface of the second gasket against the second major surface of the article.

Embodiment 32

The method of embodiment 31, exposing the outer exposed portion of the coating to the etchant is performed while applying the at least one of the first force to the first base and the second force to the second base.

Embodiment 33

The carrier apparatus of embodiment 24 or embodiment 25, the article further includes an aperture defined between a first opening in the first major surface of the article and a second opening in the second major surface of the article, an inner edge of the article extending across the thickness between the first opening and the second opening. The coating includes an inner exposed portion disposed on the inner edge of the article, and a first inner interface between the first surface of the first gasket and the coating defines a first inner boundary isolating the central portion of the coating from the inner exposed portion of the coating. A second inner interface between the second surface of the second gasket and the second major surface of the article defines a second inner boundary isolating the central portion of the second major surface of the article from the inner exposed portion of the coating. The second gasket further includes a lateral pathway connecting the second outer boundary and the second inner boundary.

Embodiment 34

A method of processing the carrier apparatus of embodiment 33 further includes exposing the outer exposed portion of the coating and the inner exposed portion of the coating to an etchant.

Embodiment 35

The method of embodiment 34, exposing the outer exposed portion of the coating and the inner exposed portion of the coating to the etchant includes submerging at least the outer exposed portion of the coating into a bath including the etchant, the etchant passes within the lateral pathway of the second gasket from the second outer boundary to the second inner boundary, thereby exposing the inner exposed portion of the coating to the etchant.

Embodiment 36

The method of embodiment 34 or embodiment 35, exposing the outer exposed portion of the coating and the inner exposed portion of the coating to the etchant removes the outer exposed portion of the coating and the inner exposed portion of the coating from the article.

Embodiment 37

The method of embodiment 36, after removing the outer exposed portion of the coating and the inner exposed portion of the coating from the article, the coating is disposed entirely on the first major surface of the article.

Embodiment 38

The method of any one of embodiments 34-37, the carrier apparatus further includes a first base including a support surface facing the first major surface of the article, and a second base including a support surface facing the second major surface of the article. The article, the coating, the first gasket, and the second gasket are positioned between the support surface of the first base and the support surface of the second base.

Embodiment 39

The method of embodiment 38 further includes applying at least one of a first force to the first base in a direction toward the support surface of the second base and a second force to the second base in a direction toward the support surface of the first base, thereby pressing the first surface of the first gasket against the coating and the second surface of the second gasket against the second major surface of the article.

Embodiment 40

The method of embodiment 39, exposing the outer exposed portion of the coating and the inner exposed portion of the coating to the etchant is performed while applying the at least one of the first force to the first base and the second force to the second base.

Embodiment 41

The method of any one of embodiments 26-32 and 34-40, the article includes a sheet including glass, glass-ceramic, ceramic, or combinations thereof.

Embodiment 42

A carrier apparatus includes an article including a first major surface, a second major surface, a thickness between the first major surface and the second major surface, and an aperture defined between a first opening in the first major surface of the article and a second opening in the second major surface of the article, an inner edge of the article extending across the thickness between the first opening and the second opening. The carrier apparatus includes a coating including a central portion disposed on the first major surface of the article and an inner exposed portion disposed on the inner edge of the article, and a plurality of gaskets. A first gasket of the plurality of gaskets includes a first surface contacting the coating, and a first inner interface between the first surface of the first gasket and the coating defines a first inner boundary isolating the central portion of the coating from the inner exposed portion of the coating. A second gasket of the plurality of gaskets includes a second surface contacting the second major surface of the article, and a second outer interface between the second surface of the second gasket and the second major surface of the article defines a second outer boundary isolating a central portion of the second major surface of the article from an outer exposed portion of the second major surface of the article, and a second inner interface between the second surface of the second gasket and the second major surface of the article defines a second inner boundary isolating the central portion of the second major surface of the article from the inner exposed portion of the coating. The second gasket includes a lateral pathway connecting the second outer boundary and the second inner boundary.

Embodiment 43

A method of processing the carrier apparatus of embodiment 42 includes exposing the inner exposed portion of the coating to an etchant.

Embodiment 44

The method of embodiment 43, exposing the inner exposed portion of the coating to the etchant includes passing the etchant within the lateral pathway of the second gasket from the second outer boundary to the second inner boundary.

Embodiment 45

The method of embodiment 43 or embodiment 44, exposing the inner exposed portion of the coating to the etchant removes the inner exposed portion of the coating from the article.

Embodiment 46

The method of embodiment 45, after removing the inner exposed portion of the coating from the article, the coating is disposed entirely on the first major surface of the article.

Embodiment 47

The method of any one of embodiments 43-46, the carrier apparatus further includes a first base including a support surface facing the first major surface of the article, and a second base including a support surface facing the second major surface of the article. The article, the coating, the first gasket, and the second gasket are positioned between the support surface of the first base and the support surface of the second base.

Embodiment 48

The method of embodiment 47 includes applying at least one of a first force to the first base in a direction toward the support surface of the second base and a second force to the second base in a direction toward the support surface of the first base, thereby pressing the first surface of the first gasket against the coating and the second surface of the second gasket against the second major surface of the article.

Embodiment 49

The method of embodiment 48, exposing the inner exposed portion of the coating to the etchant is performed while applying the at least one of the first force to the first base and the second force to the second base.

Embodiment 50

The method of any one of embodiments 43-49, the article includes a sheet including glass, glass-ceramic, ceramic, or combinations thereof.

BRIEF DESCRIPTION OF THE DRAWINGS

The above and other features and advantages of embodiments of the present disclosure are better understood when the following detailed description is read with reference to the accompanying drawings, in which.

DETAILED DESCRIPTION

Figure 1:
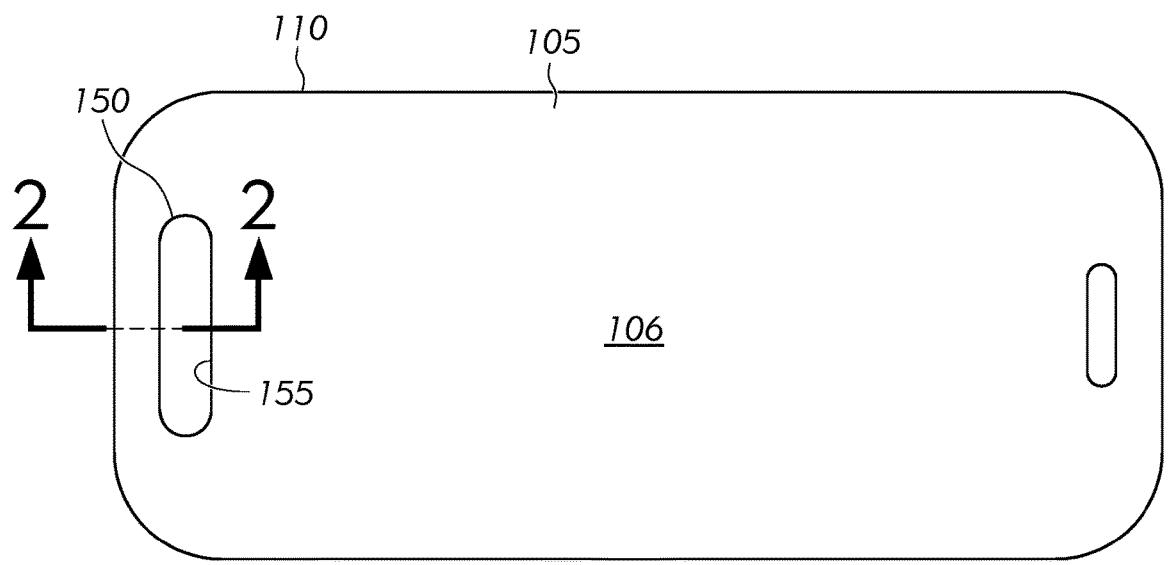
FIG. 1 illustrates a plan view of an exemplary article in accordance with embodiments of the disclosure.

Embodiments will now be described more fully hereinafter with reference to the accompanying drawings in which exemplary embodiments are shown. Whenever possible, the same reference numerals are used throughout the drawings to refer to the same or like parts. However, claims may encompass many different aspects of various embodiments and should not be construed as limited to the embodiments set forth herein.

As briefly indicated above, in various embodiments there are provided methods and apparatus for processing an article. Embodiments of articles may include silicon wafers, ceramic sheets, glass-ceramic sheets, and glass sheets. That is, in some embodiments, the articles may include glass, glass-ceramic, ceramic, silicon, or combinations thereof. When glass-ceramic, such materials include those produced through controlled crystallization of glass. In some embodiments, glass-ceramics have about 30% to about 90% crystallinity. Examples of suitable glass-ceramics may include $Li_2O$—$Al_2O_3$—$SiO_2$ system (i.e., LAS-System) glass-ceramics, $MgO$—$Al_2O_3$—$SiO_2$ system (i.e., MAS-System) glass-ceramics, $ZnO \times Al_2O_3 \times nSiO_2$ (i.e., ZAS system), and/or glass-ceramics that include a predominant crystal phase including β-quartz solid solution, β-spodumene, cordierite, and lithium disilicate. In some embodiments, the glass-ceramic substrates may be strengthened using the chemical strengthening processes disclosed herein. In some embodiments, MAS-System glass-ceramic substrates may be strengthened in $Li_2SO_4$ molten salt, whereby an exchange of $2Li^+$ for $Mg^{2+}$ may occur. In some embodiments, the article may include a sheet of glass such as a sheet containing glass or a sheet substantially or entirely fabricated from glass. The glass, if provided, may include a variety of glass compositions including, but not limited to, soda-lime glass, borosilicate glass, alumino-borosilicate glass, an alkali-containing glass, or an alkali-free glass. In some embodiments, the glass may be thermally or chemically strengthened and, when chemically strengthened, the strengthening may be ion-exchange strengthening. Features of the carrier apparatus discussed below will be described with reference to one or more glass sheets that may be incorporated as part of the carrier apparatus with the understanding that, unless otherwise noted, articles other than glass sheets may likewise be incorporated as part of the carrier apparatus.

Manufacturers of glass sheets (e.g., for use in liquid crystal displays "LCDs," electrophoretic displays "EPD," organic light emitting diode displays "OLEDs," plasma display panels "PDPs") often heat treat and/or chemically strengthen the glass sheets to improve or modify their properties. In some embodiments, a device is provided for supporting an article (e.g., a glass sheet) during processing. As may be appreciated, a glass sheet according to various embodiments may include one or more edges. For example, a glass sheet may be provided that has four edges and a generally square, rectangular, trapezoidal, parallelogram or other shape. In some embodiments, a round, oblong, or elliptical glass sheet may be provided that has one continuous edge. Other glass sheets having two, three, five, etc. edges may also be provided and are contemplated as being within the scope of the disclosure. Glass sheets of various sizes, including varying lengths, heights, and thicknesses, are also contemplated within the scope of the disclosure. In some embodiments, a nominal thickness (i.e., the thickness "t" discussed below and illustrated in the figures) of a central portion of the glass sheet may be less than or equal to about 3 mm, for example, from about 30 μm to about 3 mm, from about 30 μm to about 2 mm, from about 30 μm to about 1.5 mm, from about 30 μm to about 1 mm, from about 30 μm to about 750 μm, from about 30 μm to about 500 μm, from about 30 μm to about 400 μm, from about 30 μm to about 300 μm, from about 30 μm to about 200 μm, from about 30 μm to about 100 μm, from about 30 μm to about 50 μm, and all ranges and subranges of thicknesses therebetween.

The glass articles, including coating layers, may be used as a cover glass, for example, and may serve to, among other things, reduce undesired reflections, prevent formation of mechanical defects in the glass (e.g., scratches or cracks), and/or provide an easy to clean transparent surface. The glass articles disclosed herein may be incorporated into another article such as an article with a display (or display articles) (e.g., consumer electronic products, including mobile phones, tablets, computers, navigation systems, wearable devices (e.g., watches) and the like), architectural articles, transportation articles (e.g., automotive, trains, aircraft, sea craft, etc.), appliance articles, or any article that would benefit from some transparency, scratch-resistance, abrasion resistance or a combination thereof. An exemplary article incorporating any of the glass articles disclosed herein is a consumer electronic device including a housing having front, back, and side surfaces; electrical components that are at least partially inside or entirely within the housing and including at least a controller, a memory, and a display at or adjacent to the front surface of the housing; and a cover substrate at or over the front surface of the housing such that the cover substrate is over the display. In some embodiments, the cover substrate may include any of the glass articles disclosed herein. In some embodiments, at least one of a portion of the housing or the cover glass may include the glass articles disclosed herein.

The present disclosure provides methods and apparatus for processing one or more articles, including but not limited to, a sheet including glass, glass-ceramic, ceramic, or combinations thereof. For example, FIGS. 1-4 and 9-10 illustrate exemplary features of an article 105 that is illustrated as a glass sheet, and FIGS. 5-8 illustrate exemplary features of a carrier apparatus 100 including the article 105. Additionally, FIGS. 11-14 illustrate exemplary features of another carrier apparatus 1100 including a plurality of articles 105a, 105b, 105c that are illustrated as a plurality of glass sheets. As shown, the carrier apparatus 100 may include the article 105 (e.g., the illustrated glass sheet) and/or the carrier apparatus 1100 may include the plurality of articles 105a, 105b, 105c (e.g., the illustrated plurality of glass sheets). However, in some embodiments, the carrier apparatus 100, 1100 may be provided without the articles. For example, in some embodiments, one or more features of the carrier apparatus 100 may be provided without the article 105, where one or more features of the carrier apparatus 100 may be considered complete without the article 105. Likewise, in some embodiments, one or more features of the carrier apparatus 1100 may be provided without the illustrated plurality of articles 105a, 105b, 105c, where one or more features of the carrier apparatus 1100 may be considered complete without the plurality of articles 105a, 105b, 105c. Accordingly, in some embodiments, the carrier apparatus 100, 1100 may later be provided with an article or plurality of articles for incorporation as part of the carrier apparatus 100, 1100.

Unless otherwise noted, one or more features of the carrier apparatus 100 may be combined alone or in combination with one or more features of the carrier apparatus 1100. Likewise, unless otherwise noted, one or more features of the article 105 may be combined alone or in combination with one or more features of one or more of the plurality of articles 105a, 105b, 105c. In addition, although illustrated as including a single article 105, in some embodiments, the carrier apparatus 100 may be modified, in accordance with features of the disclosure, to include a plurality of articles. Similarly, although illustrated as including a plurality of articles 105a, 105b, 105c, in some embodiments, the carrier apparatus 1100 may be modified, in accordance with features of the disclosure, to include a single article. Moreover, although three articles 105a, 105b, 105c are illustrated in FIGS. 11-14, the carrier apparatus 1100 (as well as the carrier apparatus 100) may be modified, in accordance with features of the disclosure, to include one, two, three, four, or more articles, in some embodiments, without departing from the scope of the disclosure. Furthermore, in some embodiments, the carrier apparatus 100 and the carrier apparatus 1100 may include one or more articles that include at least one of a planar portion and a non-planar portion, without departing from the scope of the disclosure.

Figure 2:
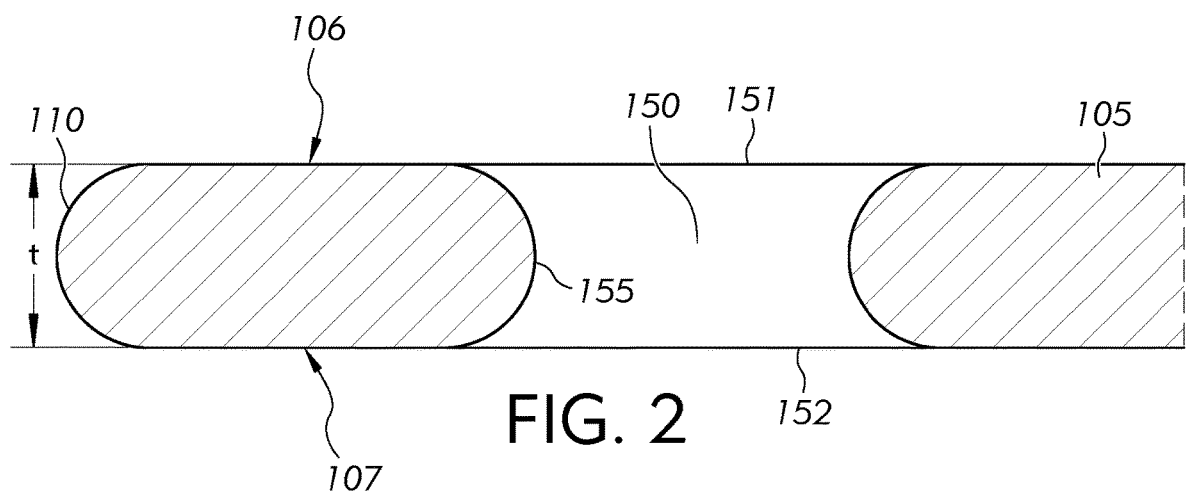
FIG. 2 shows a partial cross-sectional view of the exemplary article along line 2-2 of FIG. 1 in accordance with embodiments of the disclosure.

FIG. 1 illustrates a plan view of the article 105, and FIG. 2 shows a partial cross-sectional view of the article 105 along line 2-2 of FIG. 1. In some embodiments, the article 105 may include a first major surface 106, a second major surface 107, a thickness "t" between the first major surface 106 and the second major surface 107, and an outer edge 110 extending across the thickness "t" between the first major surface 106 and the second major surface 107. In some embodiments, the outer edge 110 of the article 105 may include a planar edge surface extending across at least a portion of the thickness "t" between the first major surface 106 and the second major surface 107. Moreover, in some embodiments, the outer edge 110 may include a non-planar edge surface (e.g., a rounded edge surface as shown in FIG. 2) extending across at least a portion of the thickness "t" between the first major surface 106 and the second major surface 107. Additionally, in some embodiments, the outer edge 110 of the article 105 may include a corner between a planar edge surface and at least one of the first major surface 106 and the second major surface 107. Similarly, in some embodiments, the outer edge 110 of the article 105 may include a corner between a non-planar edge surface and at least one of the first major surface 106 and the second major surface 107. In some embodiments, the corner may include a square corner where at least one of the first major surface 106 and the second major surface 107 connects to the planar edge surface at a substantially 90-degree angle. Alternatively, in some embodiments, the corner may include a rounded corner, a cut corner, a chamfered corner, a beveled corner, or other shape corner that connects at least one of the first major surface 106 and the second major surface 107 to the planar edge surface or to the non-planar edge surface. Accordingly, for purposes of the disclosure, irrespective of shape, the outer edge 110 of the article 105 may be defined as the surface extending across the thickness "t" of the article 105 between the first major surface 106 and the second major surface 107 and circumscribing the first major surface 106 and the second major surface 107, thereby forming the outer periphery of the article 105.

In some embodiments, the first major surface 106 and the second major surface 107 may be continuous within the outer periphery defined by the outer edge 110 of the article 105. Alternatively, in some embodiments, at least one of the first major surface 106 and the second major surface 107 of the article 105 may include a discontinuity. For example, in some embodiments, the article 105 may include an aperture 150 defined between a first opening 151 in the first major surface 106 of the article 105 and a second opening 152 in the second major surface 107 of the article 105. As shown in FIG. 2, in some embodiments, an inner edge 155 of the article 105 may extend across the thickness "t" between the first opening 151 and the second opening 152. In some embodiments, the article 105 may include a single aperture; however, in some embodiments, the article 105 may include a plurality of apertures. In some embodiments, one or more features of the aperture 150 may be applied, alone or in combination, to provide a plurality of apertures in the article 105 without departing from the scope of the disclosure.

Similar to the outer edge 110 of the article 105, in some embodiments, the inner edge 155 of the article 105 may include a planar edge surface extending across at least a portion of the thickness "t" between the first major surface 106 and the second major surface 107. Moreover, in some embodiments, the inner edge 155 may include a non-planar edge surface (e.g., a rounded edge surface as shown in FIG. 2) extending across at least a portion of the thickness "t" between the first major surface 106 and the second major surface 107. Additionally, in some embodiments, the inner edge 155 of the article 105 may include a corner between a planar edge surface and at least one of the first major surface 106 and the second major surface 107. Similarly, in some embodiments, the inner edge 155 of the article 105 may include a corner between a non-planar edge surface and at least one of the first major surface 106 and the second major surface 107. In some embodiments, the corner may include a square corner where at least one of the first major surface 106 and the second major surface 107 connects to the planar edge surface at a substantially 90-degree angle. Alternatively, in some embodiments, the corner may include a rounded corner, a cut corner, a chamfered corner, a beveled corner, or other shape corner that connects at least one of the first major surface 106 and the second major surface 107 to the planar edge surface or to the non-planar edge surface. Accordingly, for purposes of the disclosure, irrespective of shape, the inner edge 155 of the article 105 may be defined as the surface extending across the thickness "t" of the article 105 between the first major surface 106 and the second major surface 107 and circumscribing the first opening 151 in the first major surface 106 of the article 105 and the second opening 152 in the second major surface 107 of the article 105, thereby forming the inner periphery of the aperture 150 of the article 105.

Figure 3:
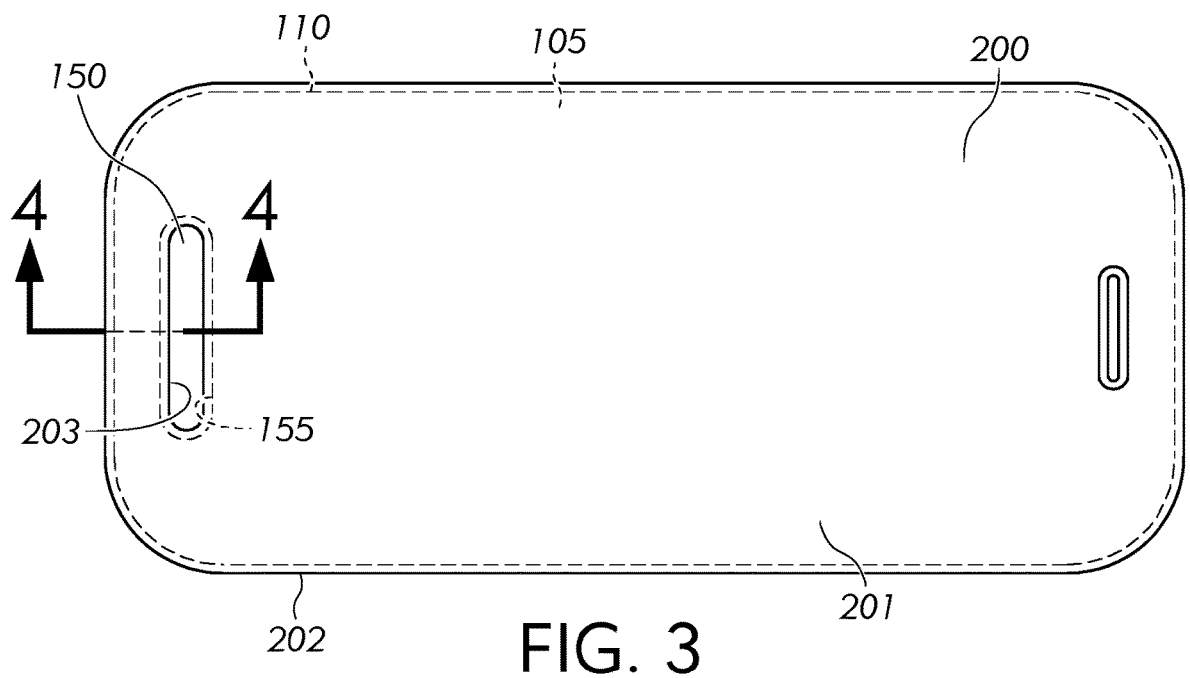
FIG. 3 illustrates a plan view of the exemplary article of FIG. 1 including a coating disposed on the article in accordance with embodiments of the disclosure.
Figure 4:
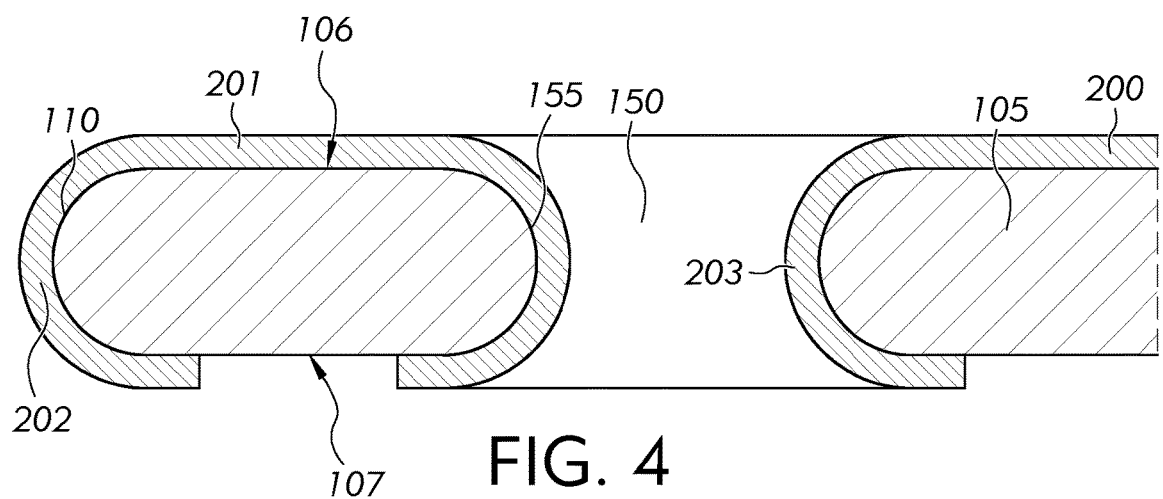
FIG. 4 shows a partial cross-sectional view of the exemplary article and the coating along line 4-4 of FIG. 3 in accordance with embodiments of the disclosure.

FIG. 3 is a plan view of the article 105 of FIG. 1 including an exemplary coating 200 disposed on the article 105. For clarity, features of the article 105 underneath the coating 200, as viewed in the plan view of the article 105 in FIG. 3, are shown as dashed lines. FIG. 4 is a partial cross-sectional view of the article 105 along line 4-4 of FIG. 3. As shown in FIG. 3 and FIG. 4, in some embodiments, the coating 200 may include a central portion 201 disposed on the first major surface 106 of the article 105 and an outer exposed portion 202 disposed on the outer edge 110 of the article 105. Additionally, in some embodiments, for example, when the article 105 includes the aperture 150, the coating 200 may include an inner exposed portion 203 disposed on the inner edge 155 of the article 105. Moreover, in some embodiments, at least a portion of at least one of the outer exposed portion 202 of the coating 200 and the inner exposed portion 203 of the coating 200 may be deposited on at least a portion of the second major surface 107 of the article 105. For example, in some embodiments, the article 105 may be processed by employing glass coating deposition technologies including at least one of physical, plasma, and chemical vapor deposition, for example, sputtering, plasma vapor deposition (PVD), chemical vapor deposition (CVD), and plasma-enhanced chemical vapor deposition (PECVD) to deposit a material on the first major surface 106 of the article 105. In some embodiments, surface treatments may enhance one or more properties, characteristics, and functions of the article 105, providing a positive experience for an end user. For example, cover glass may be coated with one or more coating layers to provide desired characteristics including, for example, anti-reflection coating layers, easy-to-clean coating layers, and abrasion and scratch resistant coating layers. In some embodiments, the coating 200 may increase strength of the article 105 to prevent breakage of article 105. Additionally, in some embodiments, the coating 200 may be optically transparent so as to provide minimal to no interference with or distortion of images that may be displayed on or viewed through the article 105.

Moreover, during a coating process, it may be desirable that the material deposited on the article 105 be deposited only on, for example, a single major surface (e.g., first major surface 106) of the article 105 with which a user may interact. For example, the article 105 may be provided in a touch-screen application where a user may physically contact and/or apply force to a single major surface of the article 105 to control features of a display device. Likewise, the article 105 may be provided in an application where the single major surface of the article 105 may be provided for viewing by a user and may, therefore, be exposed to the environment including dust, debris, and other objects that may scratch and abrade the single major surface of the article 105. In some embodiments, the coating 200 may be disposed on both the first major surface 106 and the second major surface 107 before employing methods to remove the coating 200 as well as after employing methods to remove the coating 200, as discussed below. Additionally, in some embodiments, providing the coating 200 only on the single major surface (e.g., first major surface 106) of the article 105 may provide several additional advantages.

The advantages will be described below with respect to at least one of: (1) preventing coating 200 from being deposited on at least a portion of the outer edge 110 and/or the inner edge 155, such as the entire outer edge 110 and/or the entire inner edge 155, of the article 105; a portion of the first major surface 106 of the article 105; and/or the second major surface 107 of the article 105; and (2) subsequently removing coating 200 that may have been deposited on at least a portion of the outer edge 110 and/or the inner edge 155, such as the entire outer edge 110 and/or the entire inner edge 155, of the article 105; a portion of the first major surface 106 of the article 105; and/or the second major surface 107 of the article 105.

One advantage of providing areas of the article 105, as discussed above, without the coating may include increased dimensional accuracy of the article 105. Indeed, the exact thickness of the coating 200 may be difficult to control. Thus, providing areas of the article 105, as discussed above, without the coating 200 may increase the dimensional accuracy of the article 105. For example, in some embodiments, a predetermined dimensional size of the article 105 (e.g., thickness "t", width, length, etc.) may remain unchanged during subsequent processing techniques of the carrier apparatus 100. In some embodiments, providing the entire outer edge 110 without the coating may allow the dimensions of the outer edge 110 to define the width and length of the article 105, thereby increasing dimensional accuracy. Furthermore, providing only the first major surface 106 of the article 105 with the coating 200 may avoid dimensional uncertainty in the overall thickness that may occur if the second major surface 107 of the article also included the coating 200.

Further advantages of providing areas of the article 105, as discussed above, without the coating 200 may include increasing the optical characteristics (e.g., accuracy, clarity) of the article 105. For example, in some embodiments, excess coating 200 deposited on the article 105 may reduce, degrade, or interfere with an optical characteristic of the article 105. Thus, while the coating 200 may provide advantages (e.g., increase scratch resistance and/or strength), the amount of coating 200 may be minimized to avoid excess coating 200 that would otherwise undesirably reduce, degrade, or interfere with the optical characteristics of the article 105.

Still further advantages of providing areas of the article 105, as discussed above, without the coating 200 may include increasing the strength of the article 105, including one or more area of the article 105, as discussed above. For example, in some embodiments, the coating 200 deposited on the outer edge 110 of the article 105 and the coating 200, that has not been subsequently removed from the outer edge 110 of the article 105, may impart a stress on the outer edge 110 of the article 105, whereby such stress may be reduced or eliminated by at least one of preventing coating 200 from being deposited and/or subsequently removing coating 200 that may have been deposited on the outer edge 110 of the article 105.

Accordingly, in some embodiments, during the coating process, methods and apparatus may be employed to isolate portions of the article 105 (e.g., the outer edge 110, a portion of the first major surface 106 and/or the second major surface 107) from the coating 200 during the coating process to avoid depositing coating 200 on those portions of the article 105. In some embodiments, such isolation may not occur or, despite the efforts to isolate, portions of the article desired to be free of the coating 200 may nonetheless include the coating 200. Accordingly, as set forth in the disclosure, methods and apparatus may be provided to provide at least a portion of the outer edge 110 and/or the inner edge 155, such as the entire outer edge 110 and/or the entire inner edge 155, of the article 105 free from coating 200, a portion of the first major surface 106 of the article 105 free from coating 200, and/or the second major surface 107 of the article 105 free from coating 200.

In some embodiments employing methods and apparatus of the disclosure to subsequently remove coating 200 deposited on areas of the article 105 may reduce the expense and effort associated with employing methods and apparatus to isolate these areas of the article 105 from exposure to the coating 200 during the coating process. For example, because portions of the coating 200 may be subsequently removed from the article 105 according to embodiments of the disclosure, additional measures to isolate areas of the article 105 during the coating process may be avoided, thereby reducing expense and increasing efficiency of the coating process.

Figure 5:
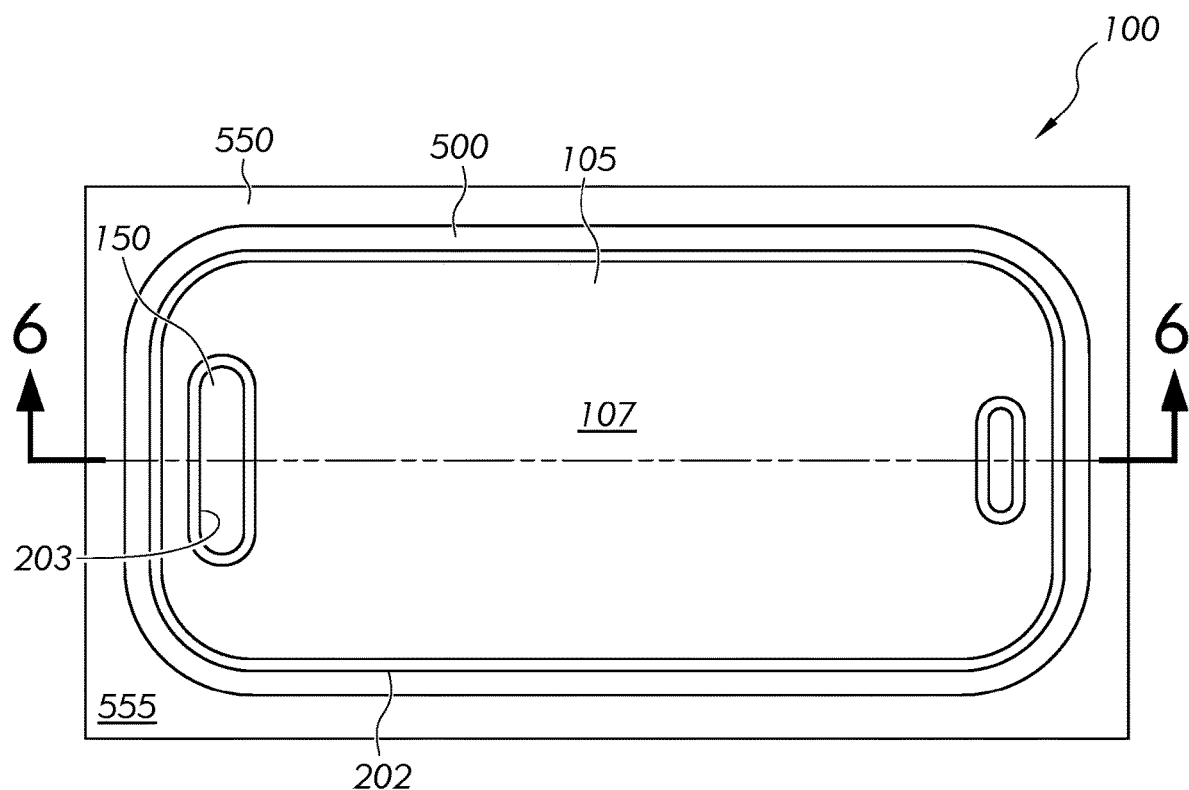
FIG. 5 illustrates a bottom view of an exemplary carrier apparatus including the article and the coating of FIG. 3 and further including a gasket and a base including a support surface, with some features of the carrier apparatus not illustrated for purposes of clarity, in accordance with embodiments of the disclosure.
Figure 6:
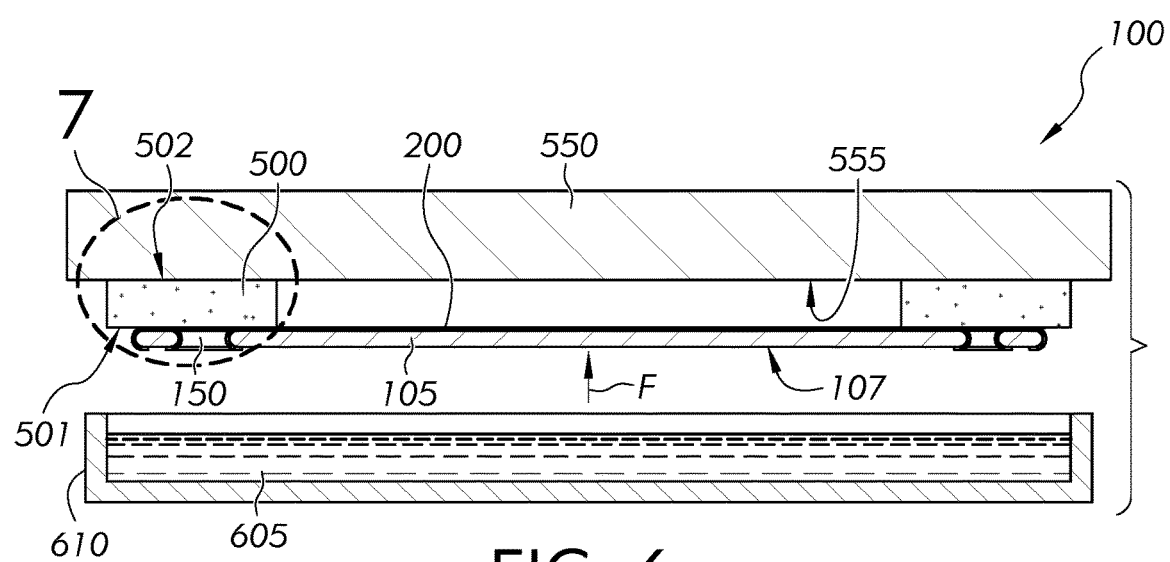
FIG. 6 shows a cross-sectional view of the exemplary carrier apparatus along line 6-6 of FIG. 5 and further including a bath including an etchant in accordance with embodiments of the disclosure.

Methods and apparatus for processing the article 105 to remove coating 200 deposited on areas of the article 105 will now be described with reference to methods and apparatus for processing the carrier apparatus 100 shown in FIGS. 5-8. For example, FIG. 5 illustrates the bottom view of the carrier apparatus 100, and FIG. 6 is a cross-sectional view of the carrier apparatus 100 along line 6-6 of FIG. 5. As shown, the carrier apparatus 100 may include a gasket 500 and a base 550 including a support surface 555. As shown in FIG. 6, in some embodiments, the gasket 500 may include a first surface 501 contacting the coating 200 and a second surface 502 contacting the support surface 555 of the base 550. In some embodiments, the gasket 500 may include a metallic foil including, but not limited to, one or more of a stainless steel foil, an aluminum foil, and a titanium foil. Additionally, in some embodiments, the gasket 500 may include at least one of a polymeric material and an elastomeric material. For example, in some embodiments, the gasket 500 may include PEEK, polytetrafluoroethylene (e.g., The Chemours Company Teflon®), silicon, plasma resistant perfluoroelastomers (e.g., DuPont de Nemours, Inc. Kalrez®), fluoroelastomers (e.g., The Chemours Company Viton™), polyimide, or other material that has minimal or no outgassing when subjected to, for example, processing temperatures, including elevated temperatures. In some embodiments, the gasket 500 may include a metallic foil including a non-abrasive coating applied to the metallic foil. In some embodiments, the gasket 500 may be flexible to conform to a shape of the article 105 and/or a shape of the base 550. In some embodiments, the gasket 500 may include at least one of an elastically deformed portion and a plastically deformed portion. For example, in some embodiments, the gasket 500 may be formed (e.g., stamped, pressed, bent) to plastically deform at least a portion of the gasket 500 to include a plastically deformed portion (e.g., recess, protrusion, opening, channel, pathway, etc.) Additionally, in some embodiments, the gasket 500 may include a preformed portion. For example, in some embodiments, the gasket 500 may be manufactured (e.g., extruded, molded, injection molded, vacuum formed, cast) to preform at least a portion of the gasket 500 to include a preformed portion (e.g., recess, protrusion, opening, channel, pathway, etc.). In some embodiments, the gasket 500 may be solid (e.g., entirely solid); however, in some embodiments, the gasket 500 may be hollow, include apertures, or include a network of at least one of solid structures and hollow structures connected together with spaces between the at least one of the solid structures and the hollow structures. Moreover, in some embodiments, the gasket 500 may include one or more of an elastically deformed portion, a plastically deformed portion, and a preformed portion.

In some embodiments, a force "F" may be applied to the article 105 in a direction toward the support surface 555 of the base 550, thereby pressing the gasket 500 between the support surface 555 of the base 550 and the coating 200 disposed on the article 105. For example, in some embodiments, the first surface 501 of the gasket 500 may abut the coating 200 and the second surface 502 of the gasket 500 may abut the support surface 555 of the base 550. In some embodiments, the force "F" may be applied by physically contacting at least one of the article 105 and the coating 200 with an object (e.g., tool, surface, etc.) to apply the force "F" in a direction toward the support surface 555 of the base 550. In addition or alternatively, in some embodiments, the force "F" may be applied by physically contacting the base 550, if provided, to force the first surface 501 of the gasket 500 against the coating 200, although the first surface 501 of the gasket 500 may be forced against the coating 200 with other configurations. For example, in some embodiments, the base 550 may provide a suction (e.g. vacuum, negative pressure) to at least one of the article 105 and the coating 200, thereby applying the force "F" in a direction toward the support surface 555 of the base 550 and pressing the gasket 500 between the support surface 555 of the base 550 and the coating 200 disposed on the article 105.

Figure 7:
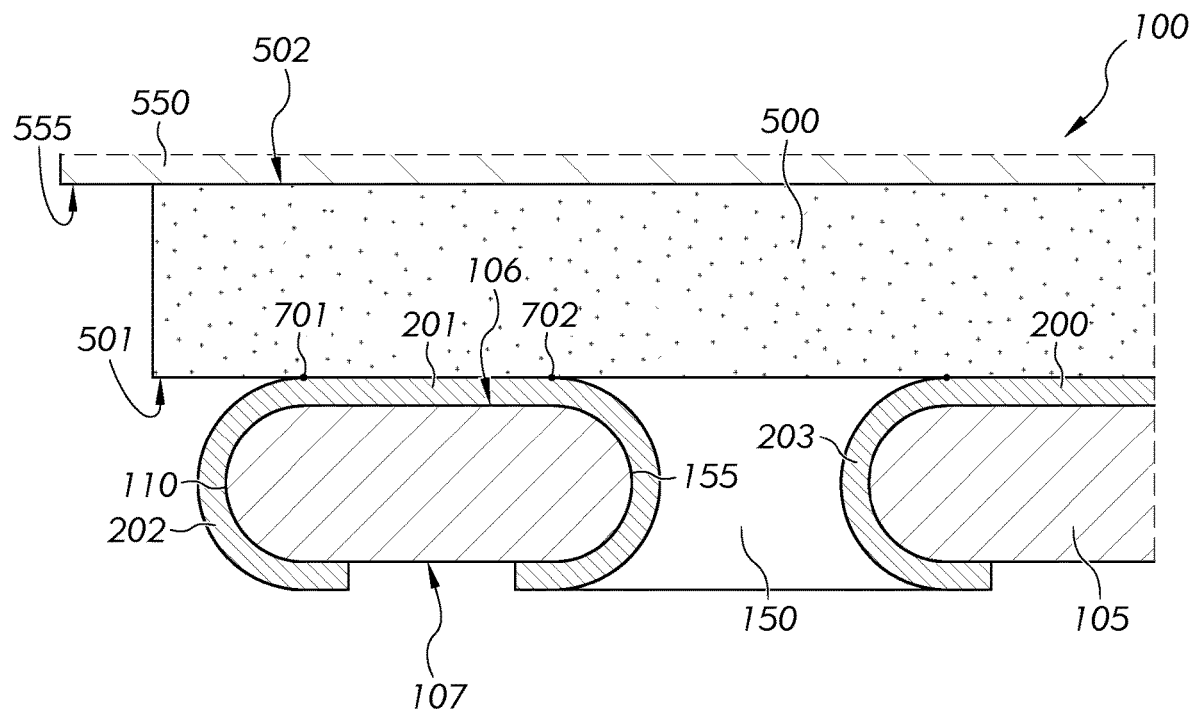
FIG. 7 shows an enlarged view of a portion of the cross-sectional view of the exemplary carrier apparatus taken at view 7 of FIG. 6 in accordance with embodiments of the disclosure.

FIG. 7 shows an enlarged view of a portion of the cross-sectional view of the carrier apparatus 100 taken at view 7 of FIG. 6. In some embodiments, an outer interface between the first surface 501 of the gasket 500 and the coating 200 defines an outer boundary 701 isolating the central portion 201 of the coating 200 from the outer exposed portion 202 of the coating 200. In some embodiments, the outer boundary 701 may define at least one of a sealed cavity and a sealed barrier that isolates the central portion 201 of the coating 200 from the outer exposed portion 202 of the coating 200. In some embodiments, the at least one of the sealed cavity and the sealed barrier defined by the outer boundary 701 may be impermeable to matter including solid matter, and fluid (e.g., liquid, gas) matter, thereby isolating the central portion 201 of the coating 200 from such matter. Likewise, in some embodiments, an inner interface between the first surface 501 of the gasket 500 and the coating 200 may define an inner boundary 702 isolating the central portion 201 of the coating 200 from the inner exposed portion 203 of the coating 200. In some embodiments, the inner boundary 702 may define at least one of a sealed cavity and a sealed barrier that isolates the central portion 201 of the coating 200 from the outer exposed portion 202 of the coating 200. In some embodiments, the at least one of the sealed cavity and the sealed barrier defined by the inner boundary 702 may be impermeable to matter including solid matter, and fluid (e.g., liquid, gas) matter, thereby isolating the central portion 201 of the coating 200 from such matter.

Referring back to FIG. 6, in some embodiments, a method of processing the carrier apparatus 100 may include exposing at least a portion of the coating 200 disposed on the article 105 to an etchant. In some embodiments, the etchant may include a chemical (e.g., an acid, a corrosive chemical, a detergent, a solution, a compound, etc.), and exposing at least a portion of the coating 200 to the chemical may disintegrate, destroy, wash, corrode, decompose, and remove at least a portion of coating 200 from the article 105. For example, in some embodiments, the carrier apparatus 100 may include a bath 610 including the etchant 605. In some embodiments, the bath 610 may include a walled vessel (e.g., container) in which the etchant 605 may be contained, providing a free surface of the etchant 605. In some embodiments, exposing at least a portion of the coating 200 to the etchant 605 may include submerging one or more of at least a portion of the coating 200, the entire coating 200, at least a portion of the article 105, the entire article 105, at least a portion of the gasket 500, the entire gasket 500, at least a portion of the base 550, and the entire base 550 into the bath 610 including the etchant 605. In some embodiments, submerging one or more of at least a portion of the coating 200, the entire coating 200, at least a portion of the article 105, the entire article 105, at least a portion of the gasket 500, the entire gasket 500, at least a portion of the base 550, and the entire base 550 into the bath 610 including the etchant 605 may be performed once, a plurality of times (e.g., repeatedly) and may include leaving one or more of at least a portion of the coating 200, the entire coating 200, at least a portion of the article 105, the entire article 105, at least a portion of the gasket 500, the entire gasket 500, at least a portion of the base 550, and the entire base 550 submerged in the bath 610 including the etchant 605 for a predetermined period of time. In addition or alternatively, in some embodiments, one or more outlets (not shown) including, for example, nozzles, orifices, sprayers, and jets may be provided to spray an etchant onto least a portion of the coating 200. Moreover, in some embodiments (not shown), other etchant application techniques including, but not limited to, linear or conveyance processing, may be employed to expose at least a portion of the coating 200 to an etchant.

In some embodiments, the method of processing the carrier apparatus 100 may include exposing the outer exposed portion 202 of the coating 200 to the etchant 605. For example, in some embodiments, exposing the outer exposed portion 202 of the coating 200 to the etchant 605 may include submerging the outer exposed portion 202 of the coating 200 into the bath 610 including the etchant 605. Similarly, in some embodiments, the method of processing the carrier apparatus 100 may include exposing the inner exposed portion 203 of the coating 200 to the etchant 605. For example, in some embodiments, exposing the inner exposed portion 203 of the coating 200 to the etchant 605 may include submerging the inner exposed portion 203 of the coating 200 into the bath 610 including the etchant 605. Moreover, in some embodiments, the method of processing the carrier apparatus 100 may include exposing the outer exposed portion 202 of the coating 200 and the inner exposed portion 203 of the coating 200 to the etchant 605. For example, in some embodiments, exposing the outer exposed portion 202 of the coating 200 and the inner exposed portion 203 of the coating 200 to the etchant 605 may include submerging the outer exposed portion 202 of the coating 200 and the inner exposed portion 203 of the coating 200 into the bath 610 including the etchant 605.

Figure 8:
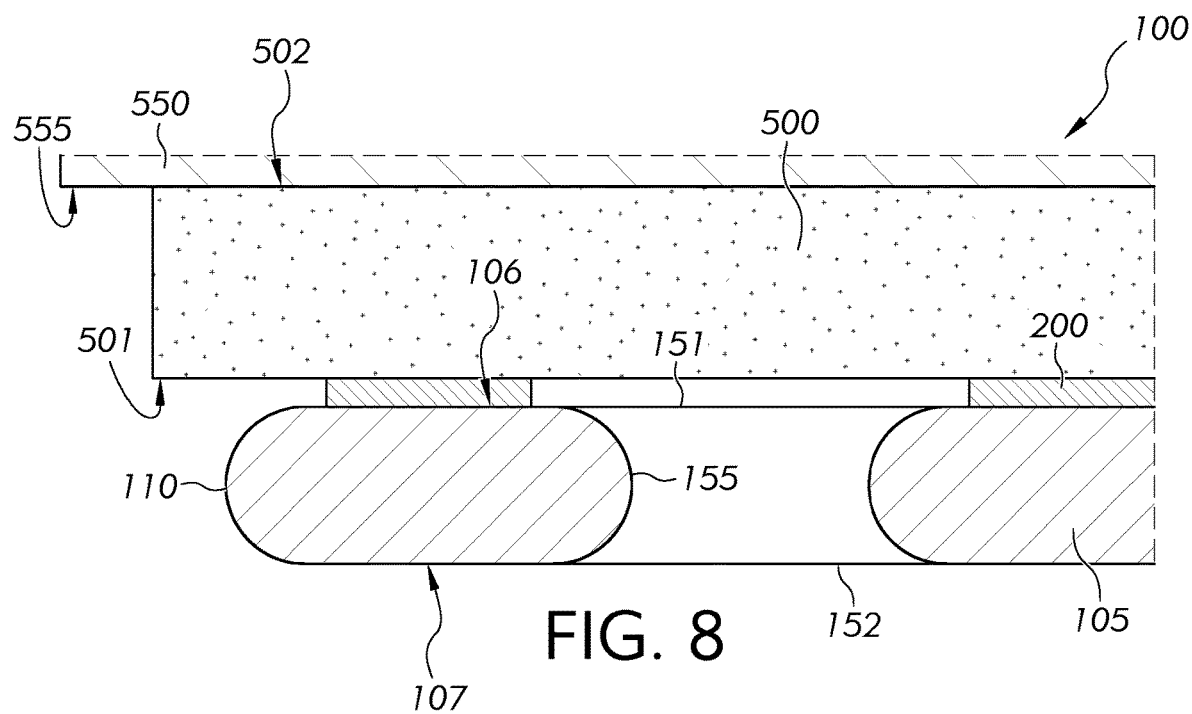
FIG. 8 shows an exemplary embodiment of the enlarged view of the portion of the cross-sectional view of the exemplary carrier apparatus of FIG. 7 after exposing a portion of the coating to an etchant in accordance with embodiments of the disclosure.
Figure 9:
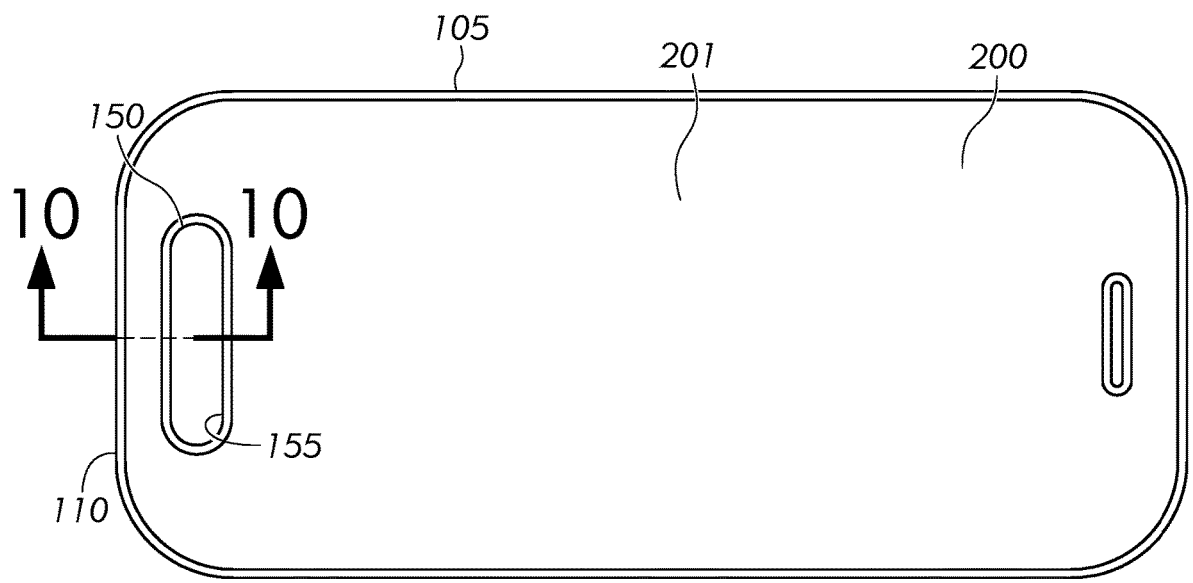
FIG. 9 illustrates a plan view of an exemplary article after exposing a portion of a coating disposed on the article to an etchant in accordance with embodiments of the disclosure.
Figure 10:
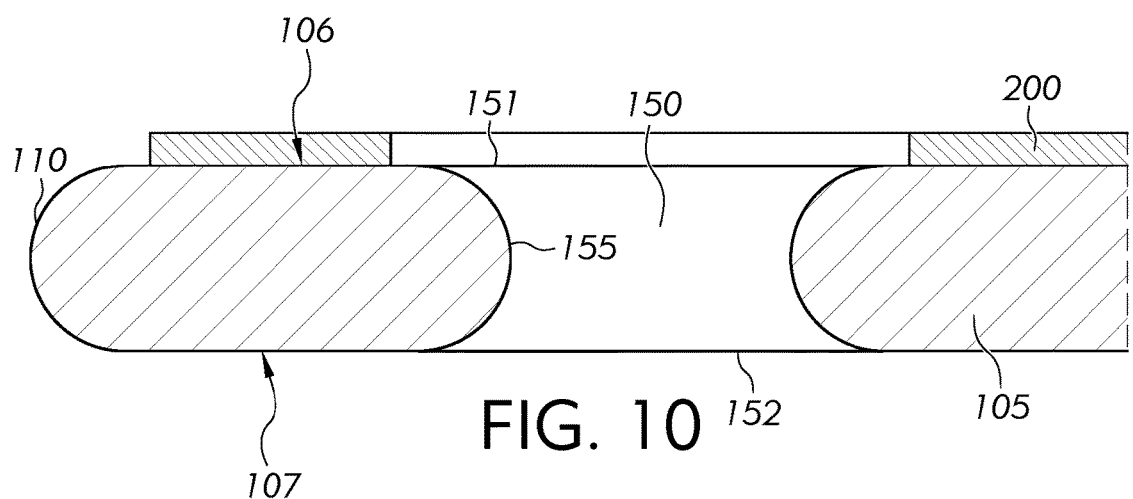
FIG. 10 shows a partial cross-sectional view of the exemplary article along line 10-10 of FIG. 9 in accordance with embodiments of the disclosure.

FIG. 8 shows an exemplary embodiment of the enlarged view of the portion of the cross-sectional view of the carrier apparatus 100 of FIG. 7 after exposing a portion of the coating 200 disposed on the article 105 to the etchant 605. Additionally, FIG. 9 illustrates a plan view of the article 105 after exposing a portion of the coating 200 to the etchant 605, and FIG. 10 shows a partial cross-sectional view of the article 105 along line 10-10 of FIG. 9 after exposing a portion of the coating 200 to the etchant 605. Thus, as shown in FIGS. 8-10, in some embodiments, exposing the outer exposed portion 202 of the coating 200 disposed on the article 105 to the etchant 605 removes the outer exposed portion 202 of the coating 200 from the article 105. In some embodiments, after removing the outer exposed portion 202 of the coating 200 from the article 105, the coating 200 may be disposed entirely on the first major surface 106 of the article 105. In some embodiments, exposing the inner exposed portion 203 of the coating 200 to the etchant 605 removes the inner exposed portion 203 of the coating 200 from the article 105. In some embodiments, after removing the inner exposed portion 203 of the coating 200 from the article 105, the coating 200 may be disposed entirely on the first major surface 106 of the article 105.

In some embodiments, the outer exposed portion 202 of the coating 200 and the inner exposed portion 203 of the coating 200 may both be exposed to the etchant 605, thereby removing the outer exposed portion 202 of the coating 200 and the inner exposed portion 203 of the coating 200 from the article 105. In some embodiments, after removing the outer exposed portion 202 of the coating 200 and the inner exposed portion 203 of the coating 200 from the article 105, the coating 200 may be disposed entirely on the first major surface 106 of the article 105. That is, in some embodiments, the coating 200 may be disposed entirely on the first major surface 106 of the article 105 without any coating on the outer edge 110 or the inner edge 155 as well as without any coating on the second major surface 107 of the article 105. Additionally, in some embodiments, the coating 200 may further be removed from one or more portions of the first major surface 106 of the article 105, where the coating 200 is disposed entirely on the first major surface 106 but doesn't coat the entire first major surface 106.

Turning back to FIG. 6, in some embodiments, exposing the outer exposed portion 202 and/or the inner exposed portion 203 of the coating 200 to the etchant 605 may be performed while applying the force "F" to the article 105. In some embodiments, applying the force "F" to the article 105 while exposing the outer exposed portion 202 and/or the inner exposed portion 203 of the coating 200 to the etchant 605 may provide the at least one of a sealed cavity and a sealed barrier that isolates the central portion 201 of the coating 200 from the outer exposed portion 202 and the inner exposed portion 203 of the coating 200. Indeed, applying the force "F" may ensure that the first surface 501 of the gasket 500 and the coating 200 abut such that the outer boundary 701 and the inner boundary 702 are impermeable to matter including solid matter, and fluid (e.g., liquid, gas) matter, thereby isolating the central portion 201 of the coating 200 from such matter (e.g., the etchant 605).

In some embodiments, at least one of the base 550 and the gasket 500 may provide a structure to which the article 105 may be attached for at least one of processing, storage, and transportation. Thus, in some embodiments, at least one of the base 550 and the gasket 500 may protect the article 105 from mechanical shock, vibrations, and other external forces to which the carrier apparatus 100 and/or the article 105 may be subjected. For example, in some embodiments, one or more features of at least one of the base 550 and the gasket 500 may laterally circumscribe the outer edge 110 of the article 105, thereby at least one of protecting and insulating the outer edge 110 of the article 105 from mechanical shock, vibrations, and other external forces to which the carrier apparatus 100 may be subjected. Throughout the disclosure, a first feature that "laterally circumscribes" a second feature is intended to mean that, in a top or bottom view in a direction perpendicular to one or more of the major surfaces of the article 105, for example, an outer periphery defined by the first feature surrounds an outer periphery defined by the second feature. Thus, for example, as shown in the bottom view of FIG. 5, an outer periphery of at least one of the base 550 and the gasket 500 surrounds the outer periphery defined by the outer edge 110 of the article 105.

Figure 11:
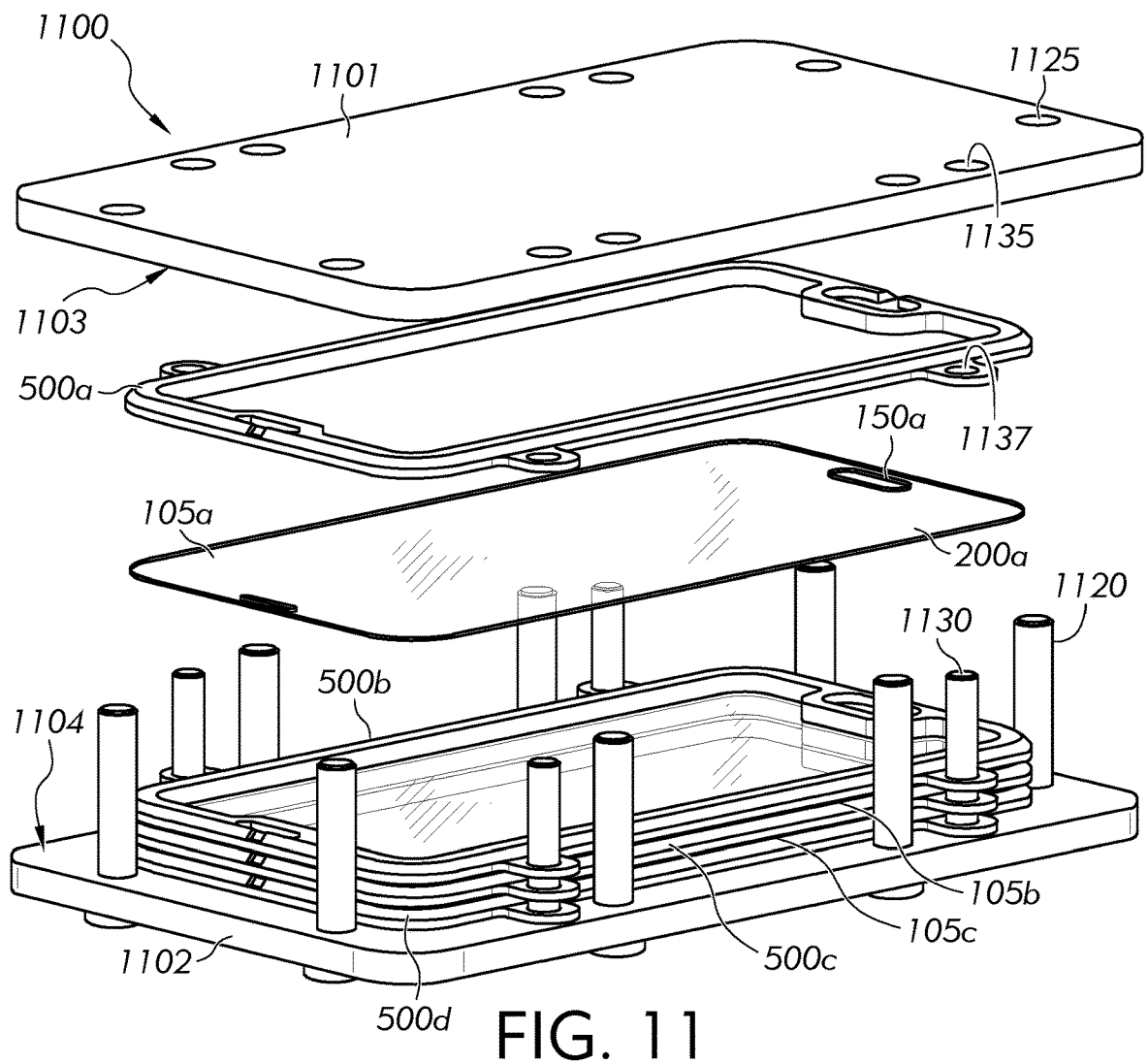
FIG. 11 illustrates a perspective view of an exemplary carrier apparatus including a plurality of articles, a plurality of gaskets, a first base, and a second base in accordance with embodiments of the disclosure.

Turning to FIGS. 11-14, the carrier apparatus 1110 is provided. In some embodiments, the carrier apparatus 1100 may include one or more features of the carrier apparatus 100. Accordingly, unless otherwise noted, features of the carrier apparatus 1100 that have the same or similar structure as features of the carrier apparatus 100 as well as features of the carrier apparatus 1100 that provide the same or similar function as features of the carrier apparatus 100 are described above with respect to the carrier apparatus 100, with the understanding that such features may apply in the same or similar manner to the carrier apparatus 1100 without being explicitly disclosed and without departing from the scope of the disclosure. As shown in FIG. 11, the carrier apparatus 1100 may include a plurality of articles 105a, 105b, 105c. Thus, unless otherwise noted, features of one or more of the plurality of articles 105a, 105b, 105c that have the same or similar structure as features of the article 105 as well as features of one or more of the plurality of articles 105a, 105b, 105c that provide the same or similar function as features of the article 105 are described above with respect to the article 105, with the understanding that such features may apply in the same or similar manner to one or more of the plurality of articles 105a, 105b, 105c without being explicitly disclosed and without departing from the scope of the disclosure In some embodiments, the carrier apparatus 1100 may include a plurality of gaskets 500a, 500b, 500c, 500d, a first base 1101 including a support surface 1103, and a second base 1102 including a support surface 1104. For clarity purposes, FIG. 11 shows the plurality of articles 105a, 105b, 105c, without a coating; however, it is to be understood, as disclosed with respect to FIGS. 12-14 that, in some embodiments, each article 105a, 105b, 105c of the plurality of articles may include a coating such as the coating 200 illustrated with respect to the article 105 discussed in FIGS. 3-10 above. Additionally, in some embodiments, one or more articles of the plurality of articles 105a, 105b, 105c may be coated, and one or more articles may not be coated. Moreover, in some embodiments, the carrier apparatus 1100 may include one or more features to, for example, facilitate assembly of the plurality of articles 105a, 105b, 105c, the plurality of gaskets 500a, 500b, 500c, 500d, the first base 1101, and the second base 1102. For example, in some embodiments, the carrier apparatus 1100 may include one or more alignment pins 1120 extending from the second base 1102 that interact with one or more alignment reliefs 1125 (e.g., at least one of a protrusion and a recess) provided in the first base 1101 to facilitate alignment of the first base 1101 and the second base 1102 relative to each other. Likewise, in some embodiments, the carrier apparatus 1100 may include one or more alignment pins 1130 extending from the second base 1102 that interact with one or more alignment reliefs provided on one or more gaskets 500a, 500b, 500c, 500d (e.g., see alignment relief 1137 provided on gasket 500a) as well as one or more alignment reliefs 1135 provided on the first base 1101 to facilitate alignment of one or more of the first base 1101, the second base 1102, and on one or more gaskets 500a, 500b, 500c, 500d of the plurality of gaskets relative to each other. Moreover, in some embodiments, one or more fasteners (not shown) including, for example, one or more of a clamp, a bracket, a removable rivet, a clip, a bolt, a screw, a pin, a latch, an anchor, a staple, a toggle, etc. may be provided to facilitate assembly of features of the carrier apparatus 1100. Accordingly, unless otherwise noted, various features, including features not explicitly disclosed, may be provided in some embodiments to facilitate assembly of features of the carrier apparatus 1100 without departing from the scope of the disclosure.

Figure 13:
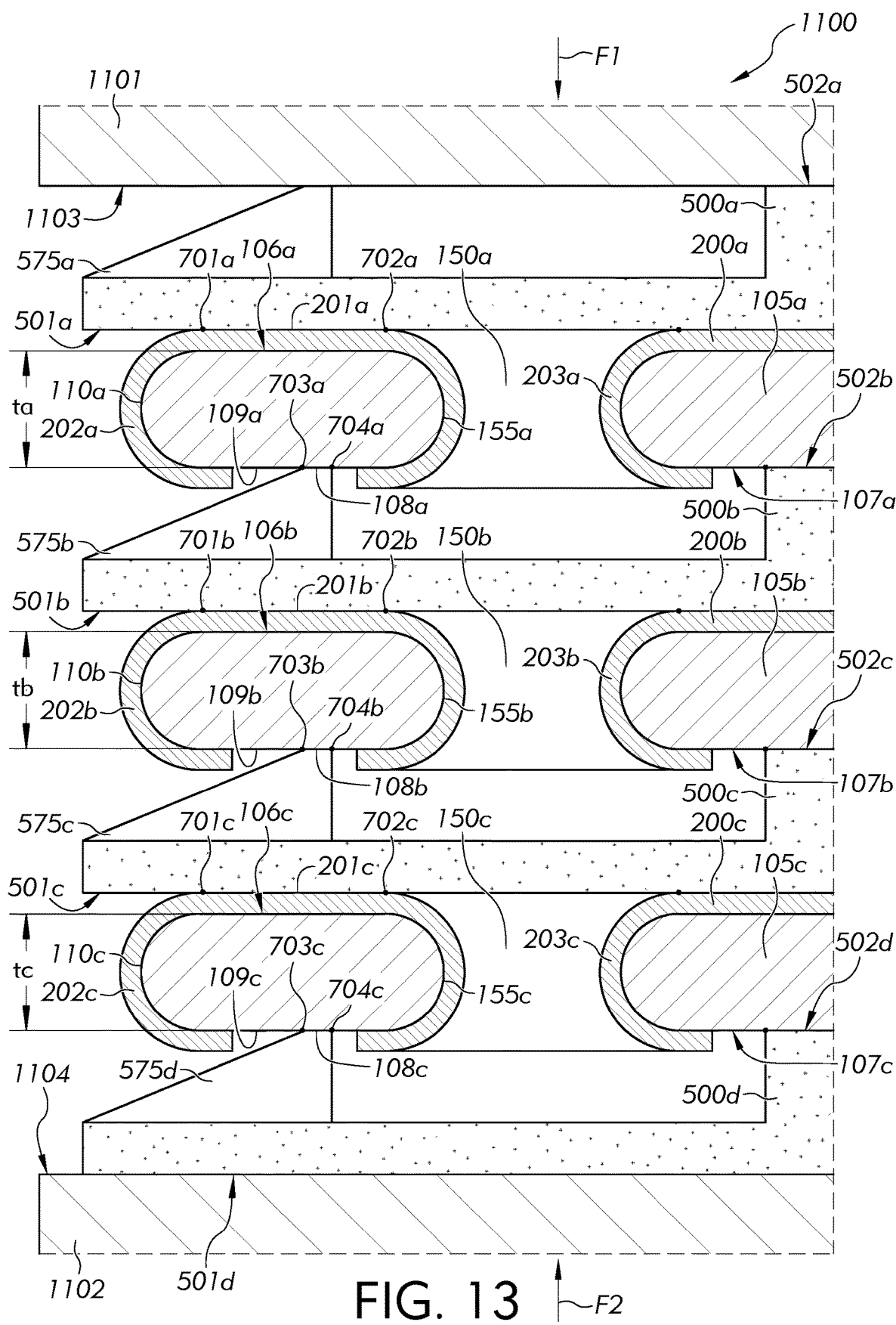
FIG. 13 illustrates an exemplary cross-sectional view of an exemplary carrier apparatus including a plurality of articles, a coating disposed on each article of the plurality of articles, a plurality of gaskets, a first base, and a second base in accordance with embodiments of the disclosure.
Figure 14:
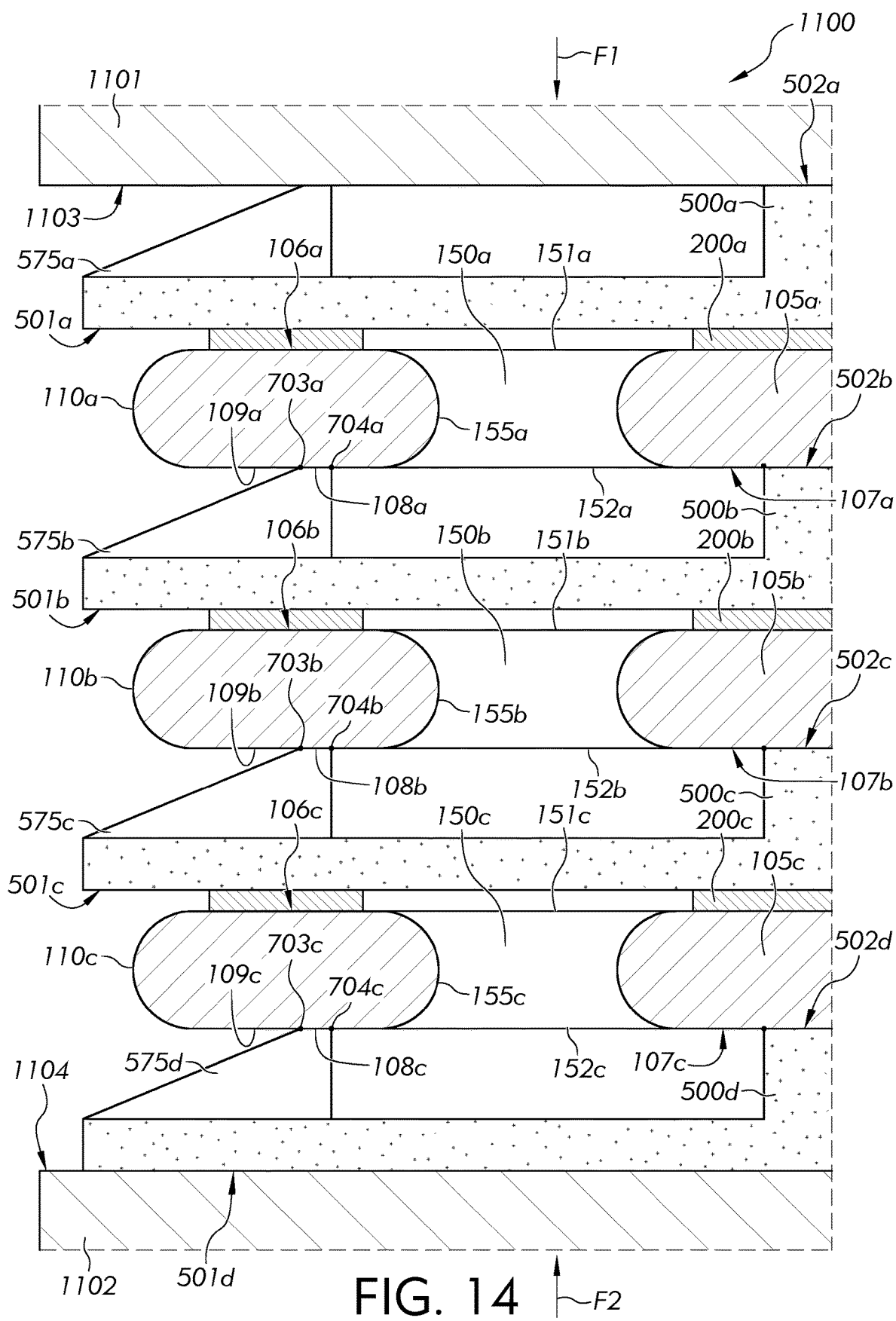
FIG. 14 shows an exemplary embodiment of the exemplary cross-sectional view of an exemplary carrier apparatus including a plurality of articles, a coating disposed on each article of the plurality of articles, a plurality of gaskets, a first base, and a second base of FIG. 13 after exposing a portion of the coating to an etchant in accordance with embodiments of the disclosure.

FIG. 13 illustrates an exemplary cross-sectional view of the carrier apparatus 1100, and FIG. 14 shows an exemplary embodiment of the exemplary cross-sectional view of FIG. 13 after exposing a portion of the coating to an etchant. In some embodiments, the article 105a, 105b, 105c may include a corresponding first major surface 106a, 106b, 106c, a corresponding second major surface 107a, 107b, 107c, a thickness "ta", "tb", "tc" between the corresponding first and second major surfaces, and a corresponding outer edge 110a, 110b, 110c extending across the corresponding thickness "ta", "tb", "tc" between the corresponding first and second major surfaces. Like the article 105 discussed in the embodiments above, each article 105a, 105b, 105c may optionally include an aperture 150a, 150b, 150c that, as shown in FIG. 14, may be defined between a first opening 151a, 151b, 151c in a corresponding first major surface 106a, 106b, 106c of the article 105a, 105b, 105c and a second opening 152a, 152b, 152c in a corresponding second major surface 107a, 107b, 107c of the article 105a, 105b, 105c. As further illustrated, each article 105a, 105b, 105c may include a corresponding inner edge 155a, 155b, 155c extending across the thickness "ta", "tb", "tc" between the corresponding first and second major surfaces.

Additionally, in some embodiments, each article 105a, 105b, 105c may be provided with a corresponding coating 200a, 200b, 200c including a central portion 201a, 201b, 201c disposed on the first major surface 106a, 106b, 106c of each article 105a, 105b, 105c. In some embodiments, each corresponding coating 200a, 200b, 200c may further include a corresponding outer exposed portion 202a, 202b, 202c disposed on the corresponding outer edge 110a, 110b, 110c of each article 105a, 105b, 105c. In some embodiments, each coating 200a, 200b, 200c may include an inner exposed portion 203a, 203b, 203c disposed on the corresponding inner edge 155a, 155b, 155c of each article. Likewise, in some embodiments, the second major surface 107a, 107b, 107c of one or more articles 105a, 105b, 105c may include at least a corresponding portion of the coating 200a, 200b, 200c.

In some embodiments, the support surface 1103 of the first base 1101 may face the first major surface 106a, 106b, 106c of the article 105a, 105b, 105c, and the support surface 1104 of the second base 1102 may face the second major surface 107a, 107b, 107c of the article 105a, 105b, 105c. Accordingly, in some embodiments, the article 105a, 105b, 105c, the coating 200a, 200b, 200c, and each gasket 500a, 500b, 500c, 500d of the plurality of gaskets may be positioned between the support surface 1103 of the first base 1101 and the support surface 1104 of the second base 1102. In some embodiments, a method of processing the carrier apparatus 1100 may include applying at least one of a first force "F1" to the first base 1101 in a direction toward the support surface 1104 of the second base 1102 and a second force "F2" to the second base 1102 in a direction toward the support surface 1103 of the first base 1101, thereby pressing one or more gaskets 500a, 500b, 500c, 500d of the plurality of gaskets and one or more articles 105a, 105b, 105c of the plurality of articles including one or more coatings 200a, 200b, 200c together.

An exemplary embodiment of the carrier apparatus 1100 with respect to article 105a will be described with the understanding that, in some embodiments, one or more features may be applied, alone or in combination and in a same or similar manner to one or more articles (e.g., article 105b, 105c) of the plurality of articles without departing from the scope of the disclosure. In some embodiments, a first gasket 500a of the plurality of gaskets may include a first surface 501a contacting the coating 200a, and a first outer interface between the first surface 501a of the first gasket 500a and the coating 200a may define a first outer boundary 701a isolating the central portion 201a of the coating 200a from the outer exposed portion 202a of the coating 200a.

Additionally, in some embodiments, a second gasket 500b of the plurality of gaskets may include a second surface 502b contacting the second major surface 107a of the article 105a, and a second outer interface between the second surface 502b of the second gasket 500b and the second major surface 107a of the article 105a may define a second outer boundary 703a isolating a central portion 108a of the second major surface 107a of the article 105a from an outer exposed portion 109a of the second major surface 107a of the article 105a. In some embodiments, the first outer boundary 701a may laterally circumscribe the second outer boundary 703a. For example, in some embodiments, with the first outer boundary 701a laterally circumscribing the second outer boundary 703a, the outer exposed portion 202a of the coating 200a may be exposed while isolating the central portion 201a of the coating 200a from the outer exposed portion 202a of the coating 200a. Furthermore, the outer exposed portion 109a of the second major surface 107a of the article 105a may be exposed while isolating the central portion 108a of the second major surface 107a of the article 105a from the outer exposed portion 109a of the second major surface 107a of the article 105a.

In some embodiments, a first inner interface between the first surface 501a of the first gasket 500a and the coating 200a may define a first inner boundary 702a isolating the central portion 201a of the coating 200a from the inner exposed portion 203a of the coating 200a. Additionally, in some embodiments, a second inner interface between the second surface 502b of the second gasket 500b and the second major surface 107a of the article 105a may define a second inner boundary 704a isolating the central portion 108a of the second major surface 107a of the article 105a from the inner exposed portion 203a of the coating 200a.

Figure 12:
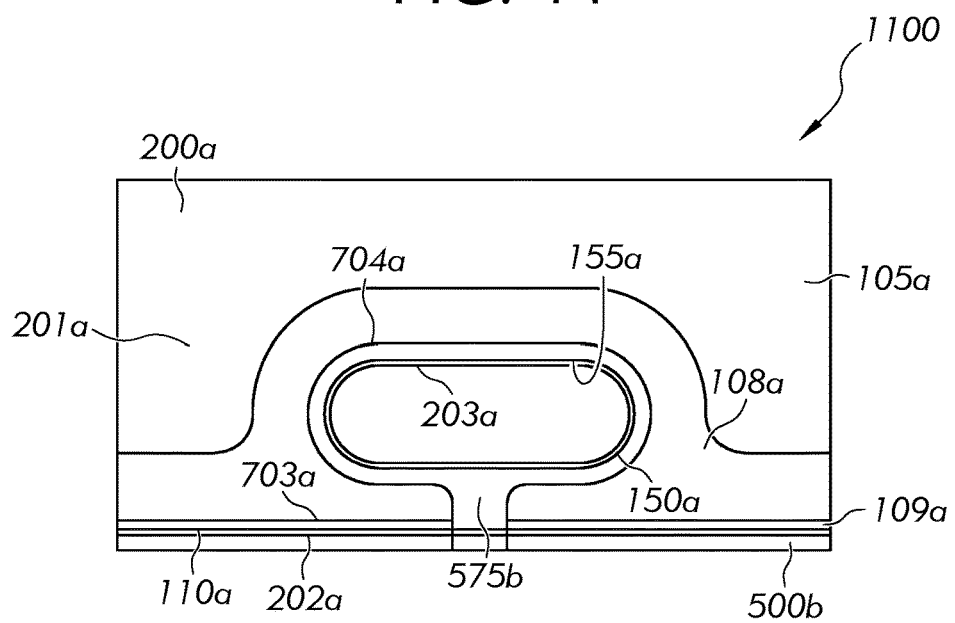
FIG. 12 illustrates a plan view of an exemplary carrier apparatus including an article including an aperture and a coating disposed on the article, and a gasket including a lateral pathway in accordance with embodiments of the disclosure.

FIG. 12 illustrates a plan view of the second gasket 500b with respect to article 105a. In some embodiments, the second gasket 500b may further include a lateral pathway 575b connecting the second outer boundary 703a and the second inner boundary 704a. In some embodiments, the lateral pathway 575b may define a path from the outer exposed portion 202a of the coating 200a to the inner exposed portion 203a of the coating 200a. Moreover, in some embodiments, each gasket 500a, 500b, 500c, 500d may include a surface 501a, 501b, 501c, 501d and a surface 502a, 502b, 502c, 502d, and a lateral pathway 575a, 575b, 575c, 575d. Likewise, in some embodiments, features of the carrier apparatus 1100 may define one or more first outer boundaries 701a 701b, 701c, first inner boundaries 702a, 702b, 702c, second outer boundaries 703a 703b, 703c, second inner boundaries 704a, 704b, 704c, outer exposed portions 109a, 109b, 109c, and central portions 108a, 108b, 108c of the second major surfaces 107a, 107b, 107c of the articles 105a, 105b, 105c. Accordingly, although described with respect to article 105a, in some embodiments, one or more features may be applied, alone or in combination and in a same or similar manner to one or more articles (e.g., article 105b, 105c) of the plurality of articles without departing from the scope of the disclosure.

A method of processing the carrier apparatus 1100 will be described with respect to the coating 200a of the article 105a with the understanding that similar or identical methods may be employed, for example simultaneously, with one or more, including all, of the articles 105a, 105b, 105c of the carrier apparatus 1100. The method may include exposing the outer exposed portion 202a of the coating 200a to an etchant (e.g., etchant 605, shown in FIG. 6). In some embodiments, exposing the outer exposed portion 202a of the coating 200a to the etchant may include submerging the outer exposed portion 202a of the coating 200a into a bath including the etchant (e.g., bath 610 including etchant 605, show in FIG. 6). In some embodiments, the method of processing the carrier apparatus 1100 may include exposing the inner exposed portion 203a of the coating 200a to an etchant. In some embodiments, exposing the inner exposed portion 203a of the coating 200a to the etchant may include passing the etchant within the lateral pathway 575b of the second gasket 500b from the second outer boundary 703a to the second inner boundary 704a. In some embodiments, the method of processing the carrier apparatus 1100 may include exposing the outer exposed portion 202a of the coating 200a and the inner exposed portion 203a of the coating 200a to an etchant. In some embodiments, exposing the outer exposed portion 202a of the coating 200a and the inner exposed portion 203a of the coating 200a to an etchant may include submerging at least the outer exposed portion 202a of the coating 200a into a bath including the etchant, where the etchant passes within the lateral pathway 575b of the second gasket 500b from the second outer boundary 703a to the second inner boundary 704a, thereby exposing the inner exposed portion 203a of the coating 200a to the etchant. In some embodiments, exposing the outer exposed portion 202a of the coating 200a to an etchant, exposing the inner exposed portion 203a of the coating 200a to an etchant, and exposing the outer exposed portion 202a of the coating 200a and the inner exposed portion 203a of the coating 200a to an etchant may be performed while applying the at least one of the first force "F1" to the first base 1101 and the second force "F2" to the second base 1102, thereby pressing the first surface 501a of the first gasket 500a against the coating 200a and the second surface 502b of the second gasket 500b against the second major surface 107a of the article 105a.

In some embodiments, exposing the outer exposed portion 202a of the coating 200a to the etchant removes the outer exposed portion 202a of the coating 200a from the article 105a. In some embodiments, after removing the outer exposed portion 202a of the coating 200a from the article 105a, the coating 200a may be disposed entirely on the first major surface 106a of the article 105a. Likewise, in some embodiments, exposing the inner exposed portion 203a of the coating 200a to the etchant removes the inner exposed portion 203a of the coating 200a from the article 105a. In some embodiments, after removing the inner exposed portion 203a of the coating 200a from the article 105a, the coating 200a may be disposed entirely on the first major surface 106a of the article 105a. Furthermore, in some embodiments, exposing the outer exposed portion 202a of the coating 200a and the inner exposed portion 203a of the coating 200a to the etchant removes the outer exposed portion 202a of the coating 200a and the inner exposed portion 203a of the coating 200a from the article 105a. In some embodiments, after removing the outer exposed portion 202a of the coating 200a and the inner exposed portion 203a of the coating 200a from the article 105a, the coating 200a may be disposed entirely on the first major surface 106a of the article 105a. That is, in some embodiments, with the coating 200a disposed entirely on the first major surface 106a of the article 105a, one or more of at least a portion of the outer edge 110a of the article 105a, the entire outer edge 110a of the article 105a, a portion of the first major surface 106a of the article 105a, and the second major surface 107a of the article 105a may be entirely free from coating 200a. As disclosed, in some embodiments, removing coating 200a that may have been deposited on at least a portion of the outer edge 110a of the article 105a, the entire outer edge 110a of the article 105a, a portion of the first major surface 106a of the article 105a, and the second major surface 107a of the article 105a may provide several advantages.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other.

The above embodiments, and the features of those embodiments, are exemplary and may be provided alone or in any combination with any one or more features of other embodiments provided herein without departing from the scope of the disclosure.

It will be apparent to those skilled in the art that various modifications and variations may be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A method of processing a carrier apparatus comprising:
an article comprising a first major surface, a second major surface, a thickness between the first major surface and the second major surface, and an outer edge extending across the thickness between the first major surface and the second major surface;
a coating comprising a central portion disposed on the first major surface of the article and an outer exposed portion disposed on the outer edge of the article; and
a gasket comprising a first surface contacting the coating, an outer interface between the first surface of the gasket and the coating defines an outer boundary isolating the central portion of the coating from the outer exposed portion of the coating, the method comprising:
exposing the outer exposed portion of the coating to an etchant,
wherein exposing the outer exposed portion of the coating to the etchant comprises submerging the outer exposed portion of the coating into a bath comprising the etchant.

2. The method of claim 1, exposing the outer exposed portion of the coating to the etchant removes the outer exposed portion of the coating from the article.

3. The method of claim 2, after removing the outer exposed portion of the coating from the article, the coating is disposed entirely on the first major surface of the article.

4. The method of claim 1, the carrier apparatus further comprising a base comprising a support surface, a second surface of the gasket contacting the support surface of the base, and the method further comprising applying a force to the article in a direction toward the support surface of the base, thereby pressing the gasket between the support surface of the base and the coating.

5. The method of claim 4, exposing the outer exposed portion of the coating to the etchant is performed while applying the force to the article.

6. A method of processing a carrier apparatus comprising:
an article comprising a first major surface, a second major surface, a thickness between the first major surface and the second major surface, and an outer edge extending across the thickness between the first major surface and the second major surface;
a coating comprising a central portion disposed on the first major surface of the article and an outer exposed portion disposed on the outer edge of the article; and
a gasket comprising a first surface contacting the coating, an outer interface between the first surface of the gasket and the coating defines an outer boundary isolating the central portion of the coating from the outer exposed portion of the coating,
wherein the article further comprises:
an aperture defined between a first opening in the first major surface of the article and a second opening in the second major surface of the article, an inner edge of the article extending across the thickness between the first opening and the second opening, the coating comprising an inner exposed portion disposed on the inner edge of the article, and an inner interface between the first surface of the gasket and the coating defines an inner boundary isolating the central portion of the coating from the inner exposed portion of the coating, and
further wherein the method comprises:
exposing the outer exposed portion of the coating and the inner exposed portion of the coating to an etchant.

7. The method of claim 6, exposing the outer exposed portion of the coating and the inner exposed portion of the coating to the etchant comprises submerging the outer exposed portion of the coating and the inner exposed portion of the coating into a bath comprising the etchant.

8. The method of claim 6, exposing the outer exposed portion of the coating and the inner exposed portion of the coating to the etchant removes the outer exposed portion of the coating and the inner exposed portion of the coating from the article.

9. The method of claim 8, after removing the outer exposed portion of the coating and the inner exposed portion of the coating from the article, the coating is disposed entirely on the first major surface of the article.

10. The method of claim 6, wherein the carrier apparatus further comprises:
a base comprising a support surface, a second surface of the gasket contacting the support surface of the base, and the method further comprising applying a force to the article in a direction toward the support surface of the base, thereby pressing the gasket between the support surface of the base and the coating.

11. The method of claim 10, exposing the outer exposed portion of the coating and the inner exposed portion of the coating to the etchant is performed while applying the force to the article.

12. A method of processing a carrier apparatus comprising:
an article comprising a first major surface, a second major surface, a thickness between the first major surface and the second major surface, and an outer edge extending across the thickness between the first major surface and the second major surface;
a coating comprising a central portion disposed on the first major surface of the article and an outer exposed portion disposed on the outer edge of the article; and
a plurality of gaskets, a first gasket of the plurality of gaskets comprising a first surface contacting the coating, a first outer interface between the first surface of the first gasket and the coating defines a first outer boundary isolating the central portion of the coating from the outer exposed portion of the coating, and a second gasket of the plurality of gaskets comprising a second surface contacting the second major surface of the article, a second outer interface between the second surface of the second gasket and the second major surface of the article defines a second outer boundary isolating a central portion of the second major surface of the article from an outer exposed portion of the second major surface of the article, wherein the first outer boundary laterally circumscribes the second outer boundary, the method comprising:
exposing the outer exposed portion of the coating to an etchant,
wherein exposing the outer exposed portion of the coating to the etchant comprises submerging the outer exposed portion of the coating into a bath comprising the etchant.

13. The method of claim 12, exposing the outer exposed portion of the coating to the etchant removes the outer exposed portion of the coating from the article.

14. The method of claim 13, after removing the outer exposed portion of the coating from the article, the coating is disposed entirely on the first major surface of the article.

15. The method of claim 12, wherein the carrier apparatus further comprises:
a first base comprising a support surface facing the first major surface of the article, a second base comprising a support surface facing the second major surface of the article, the article, the coating, the first gasket, and the second gasket are positioned between the support surface of the first base and the support surface of the second base.

16. The method of claim 15, comprising applying at least one of a first force to the first base in a direction toward the support surface of the second base and a second force to the second base in a direction toward the support surface of the first base, thereby pressing the first surface of the first gasket against the coating and the second surface of the second gasket against the second major surface of the article.

17. The method of claim 16, exposing the outer exposed portion of the coating to the etchant is performed while applying the at least one of the first force to the first base and the second force to the second base.

18. The method of claim 1, wherein the coating is processed through a physical vapor deposition process, a plasma vapor deposition process or a chemical vapor deposition process.

19. The method of claim 1, wherein the etchant comprises an acid, a corrosive chemical, a detergent or a solution.

* * * * *

UNITED STATES PATENT AND TRADEMARK OFFICE
CERTIFICATE OF CORRECTION

PATENT NO. : 10,836,674 B2  
APPLICATION NO. : 16/496214  
DATED : November 17, 2020  
INVENTOR(S) : Michael Patrick Donovan et al.

Page 1 of 1

It is certified that error appears in the above-identified patent and that said Letters Patent is hereby corrected as shown below:

On the Title Page

In Column 1, item (72), Inventors, Line 3, delete "Coming," and insert -- Corning, --, therefor.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*